United States Patent
Griggs et al.

(10) Patent No.: US 12,519,650 B2
(45) Date of Patent: *Jan. 6, 2026

(54) METHOD FOR SECURING PRIVATE STRUCTURED DATABASES WITHIN A PUBLIC BLOCKCHAIN

(71) Applicant: Chia Network Inc.

(72) Inventors: Kenneth K. Griggs, San Francisco, CA (US); Bram Cohen, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,531

(22) Filed: Jun. 17, 2024

(65) Prior Publication Data

US 2024/0340183 A1 Oct. 10, 2024

Related U.S. Application Data

(63) Continuation of application No. 17/966,214, filed on Oct. 14, 2022, now Pat. No. 12,052,369.

(60) Provisional application No. 63/289,564, filed on Dec. 14, 2021, provisional application No. 63/256,422, filed on Oct. 15, 2021.

(51) Int. Cl.
*H04L 9/00* (2022.01)
*H04L 9/32* (2006.01)

(52) U.S. Cl.
CPC .......... *H04L 9/3236* (2013.01); *H04L 9/3247* (2013.01); *H04L 9/50* (2022.05)

(58) Field of Classification Search
CPC ............................ H04L 9/3236; H04L 9/3247
See application file for complete search history.

(56) References Cited

U.S. PATENT DOCUMENTS

| | | | |
|---|---|---|---|
| 12,052,369 B2 * | 7/2024 | Griggs | H04L 9/3236 |
| 2020/0372015 A1 * | 11/2020 | Baird, III | H04L 9/3239 |
| 2021/0256013 A1 * | 8/2021 | Yang | G06F 16/2379 |
| 2021/0334804 A1 * | 10/2021 | Zhuo | H04L 9/3239 |
| 2022/0036366 A1 * | 2/2022 | Wu | G16H 10/60 |
| 2022/0078006 A1 * | 3/2022 | Krishnamurthy | H04L 9/3239 |
| 2022/0216997 A1 * | 7/2022 | Davies | H04L 9/3239 |

\* cited by examiner

*Primary Examiner* — David J Pearson
(74) *Attorney, Agent, or Firm* — Run8 Patent Group, LLC; Peter Miller; Brian T. Chew

(57) ABSTRACT

A method includes: generating a hash tree representing a structured data object including a data unit, the hash tree including a root hash and a data unit hash representing the data unit; submitting a first transaction to a distributed network, the first transaction configured to generate a blockchain object including the root hash, the blockchain object configured to generate an announcement representing membership of the data unit hash in the hash tree; and submitting a second transaction to the distributed network, the second transaction configured to trigger the blockchain object to generate the announcement based on a proof of inclusion of the data unit hash within the hash tree.

20 Claims, 5 Drawing Sheets

METHOD FOR SECURING PRIVATE STRUCTURED DATABASES WITHIN A PUBLIC BLOCKCHAIN

CROSS-REFERENCE TO RELATED APPLICATIONS

This Application is a continuation of U.S. patent application Ser. No. 17/966,214, filed on 14 Oct. 2022, which claims the benefit of U.S. Provisional Application No. 63/289,564, filed on 14 Dec. 2021, and 63/256,422, filed on 15 Oct. 2021, each of which is incorporated in its entirety by this reference.

TECHNICAL FIELD

This invention relates generally to the field of secure data storage and more specifically to a new and useful method for securing private structured databases within the field of secure data storage.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
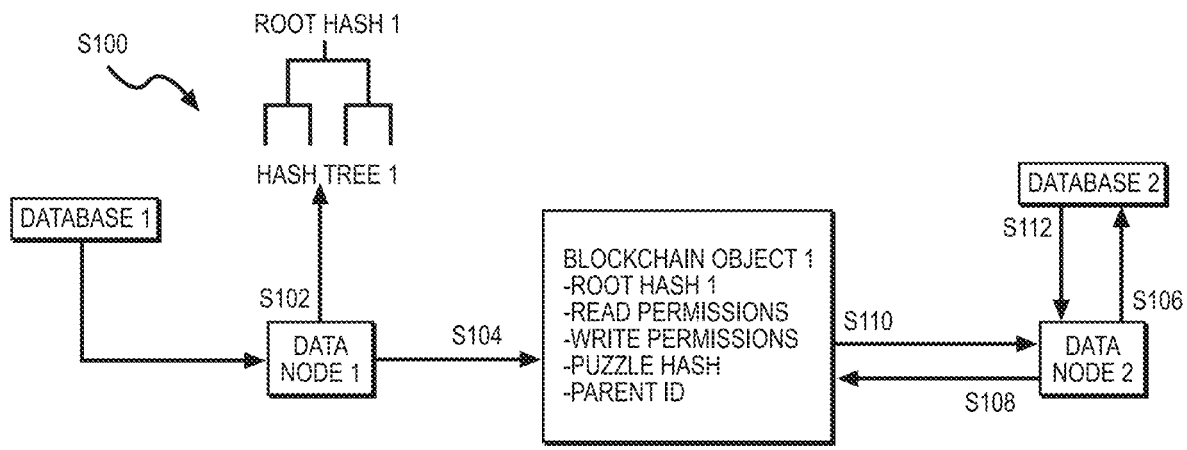
FIGS. 1A and 1B is a schematic representation of a method.
Figure 1B:
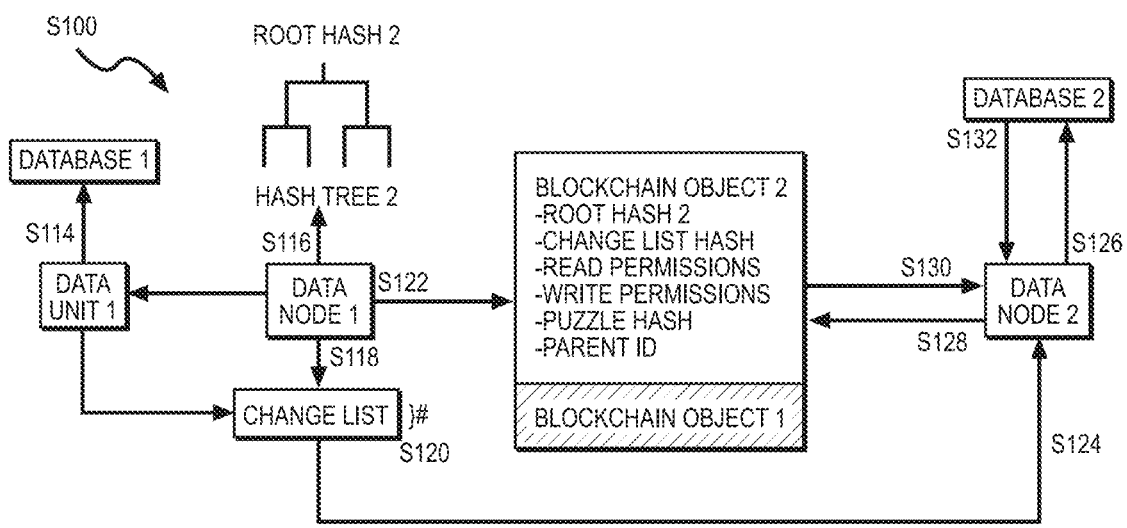

As shown in FIGS. 1A and 1B, a method S100 for extending a blockchain in a distributed network includes: during a first time period, by a first data node in the distributed network: generating a first hash tree representing a first state of a first structured data object in Block S102, the first hash tree including a first root hash; and submitting a first transaction to the distributed network in Block S104, the first transaction configured to generate a first blockchain object in a set of blockchain objects, the first blockchain object including the first root hash.

The method S100 further includes, during a second time period succeeding the first time period, by the first data node: inserting a first data unit in the first state of the first structured data object in Block S114; generating a second hash tree representing a second state of the first structured data object including the first data unit in Block S116, the second hash tree including a second root hash; and submitting a second transaction to the distributed network in Block S122, the second transaction configured to generate a second blockchain object in the set of blockchain objects, the second blockchain object including the second root hash.

1.1 Variation: Initiating a Data-Dependent Transaction

Figure 2:
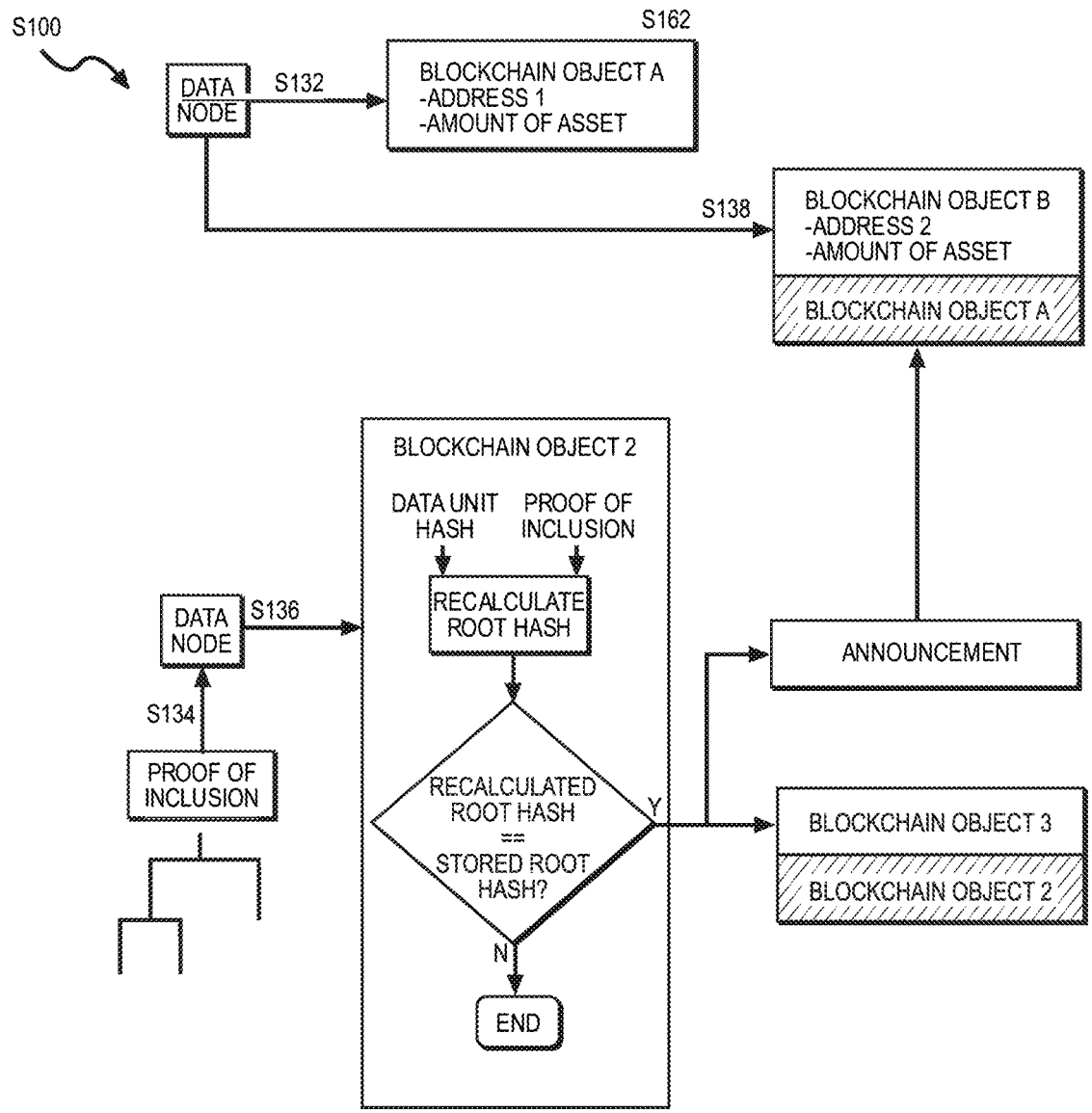
FIG. 2 is a schematic representation of one variation of the method.

As shown in FIGS. 1A, 1B, and 2, one variation of the method S100 includes, during a first time period, by a first data node in the distributed network: generating a first hash tree representing a first state of a structured data object in Block S102, the first hash tree including a first root hash; and submitting a first transaction to the distributed network in Block S104, the first transaction configured to generate a first blockchain object in a set of blockchain objects, the first blockchain object including the first root hash.

This variation of the method S100 further includes, during the first time period, by a second data node in the distributed network: submitting a second transaction to the distributed network in Block S132, the second transaction configured to generate a second blockchain object in the set of blockchain objects, the second blockchain object configured to transfer an amount of an asset to an address associated with the first data node in response to detecting membership of a first data unit hash in a second hash tree representing a second state of the structured data object including a first data unit, the first data unit hash representing the first data unit.

1.2 Variation: Generating an Announcement of Data Inclusion

As shown in FIGS. 1B and 2, one variation of the method S100 includes: generating a hash tree representing a structured data object including a data unit in Block S116, the hash tree including a root hash and a data unit hash representing the data unit; submitting a first transaction to the distributed network in Block S122, the first transaction configured to generate a blockchain object a) including the root hash and b) configured to generate an announcement representing membership of the data unit hash in the hash tree; and submitting a second transaction to the distributed network in Block S136, the second transaction configured to trigger the blockchain object to generate the announcement based on a proof of inclusion of the data unit hash within the hash tree.

1.3 Variation: Atomic Update of Multiple Blockchain Objects

Figure 3:
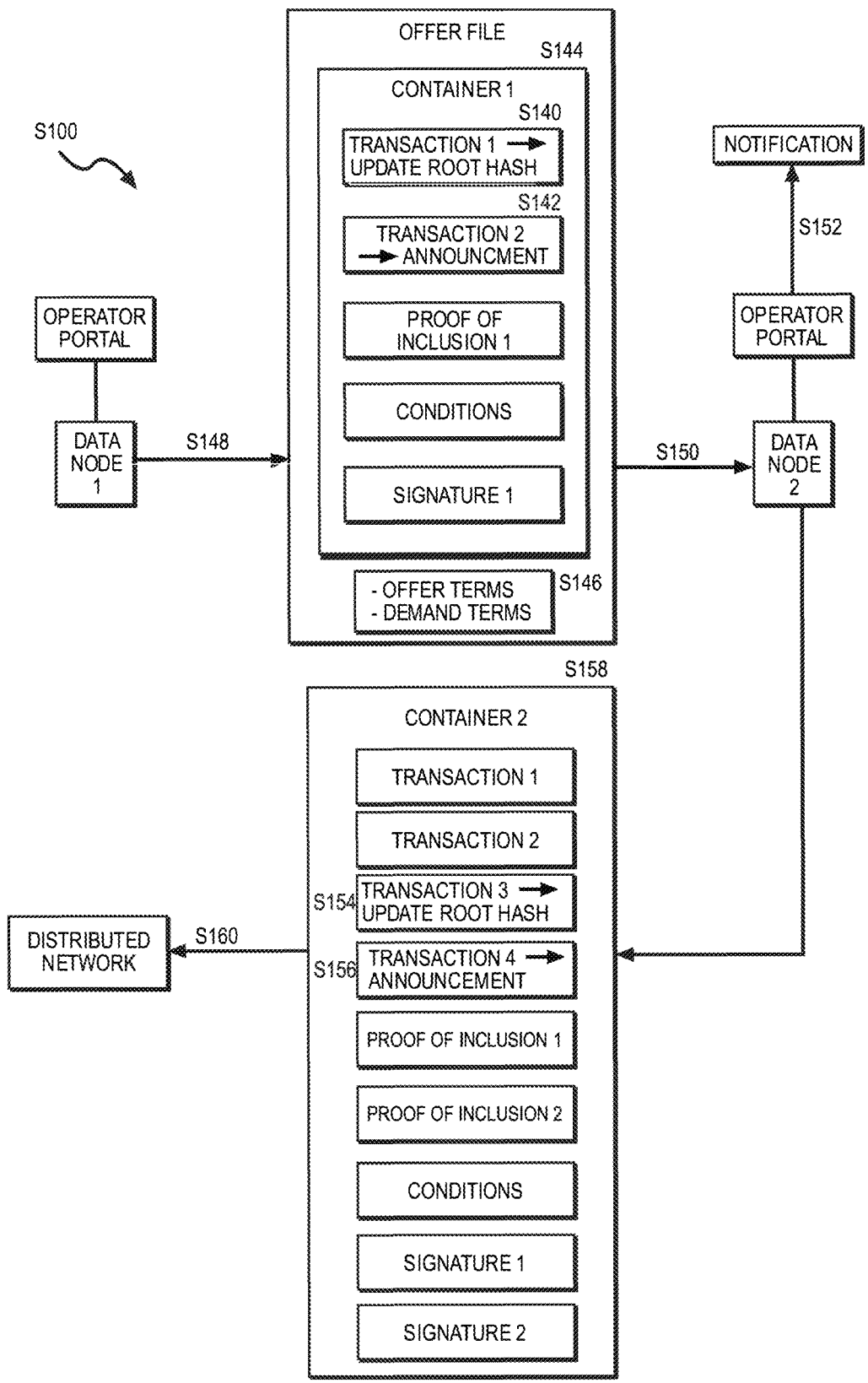
FIG. 3 is a schematic representation of one variation of the method.
Figure 4:
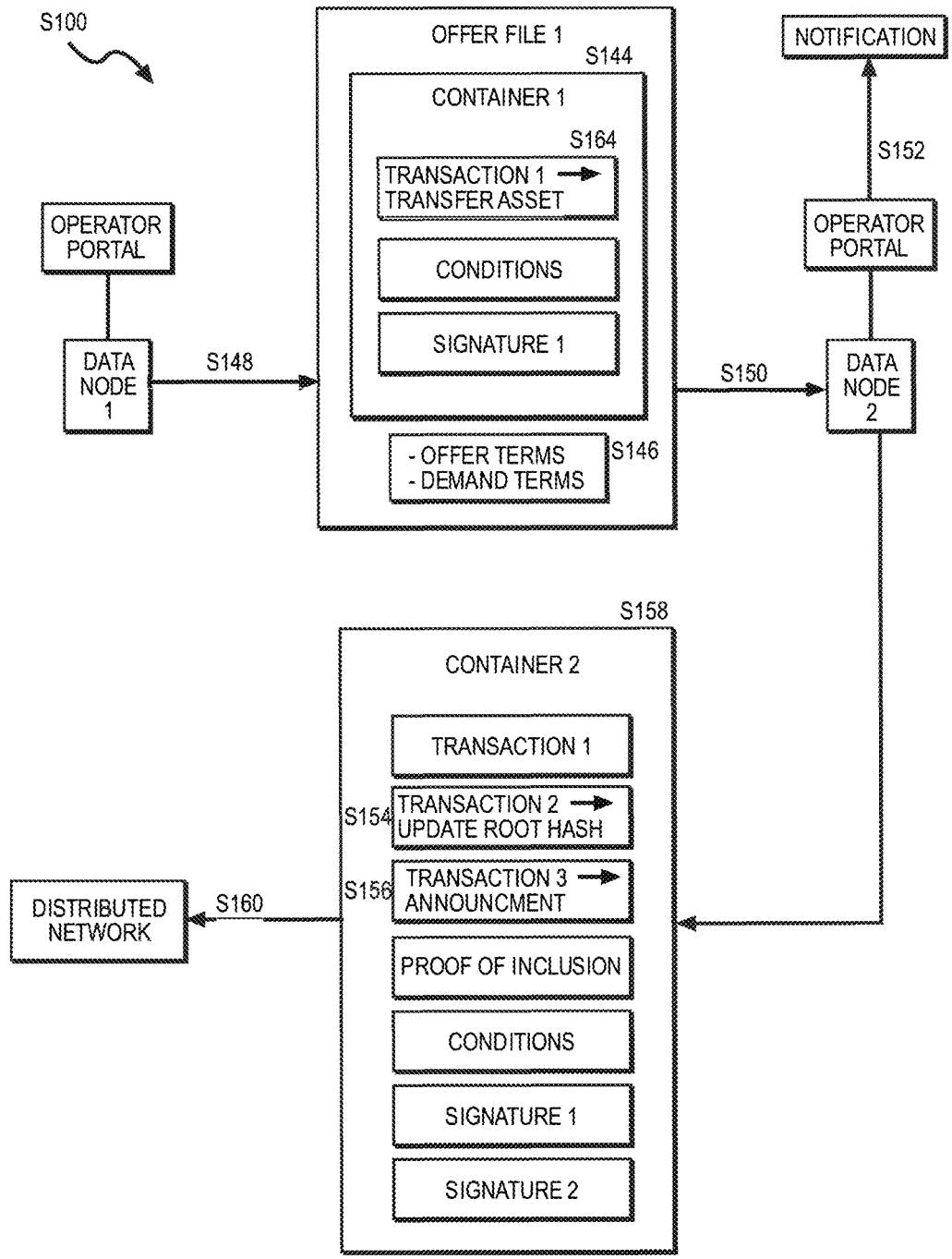
FIG. 4 is a schematic representation of one variation of the method.

As shown in FIGS. 1A, 1B, and 3, one variation of the method S100 includes, during a first time period, by a first data node in the distributed network: generating a first hash tree representing the first state of the first structured data object in Block S102, the first hash tree including a first root hash; and submitting a first transaction to the distributed network in Block S104, the first transaction configured to generate a first blockchain object in a set of blockchain objects, the first blockchain object including the first root hash.

This variation of the method S100 further includes, during a second time period succeeding the first time period, by the first data node: generating a second hash tree representing a second state of the first structured data object including a first data unit in Block S116, the second hash tree including a) a second root hash b) a first data unit hash representing the first data unit; accessing a first non-interactive proof of inclusion of the first data unit hash within the second hash tree in Block S134; generating a second transaction configured to generate a second blockchain object in the set of blockchain objects in Block S140, the second blockchain object including the second root hash; generating a first transaction container in Block S144, the first transaction container a) including the second transaction and the first non-interactive proof of inclusion, and b) that is valid based on a first condition characterized by membership of a second data unit hash in a third hash tree, the second data unit hash representing a second data unit, the third hash tree representing a third state of a second structured data object including the second data unit; and transmitting an offer file to a second data node in the distributed network in Block S150, the offer file including the first transaction container.

1.4 Variation: Offering to Pay on Data Inclusion

Figure 5:
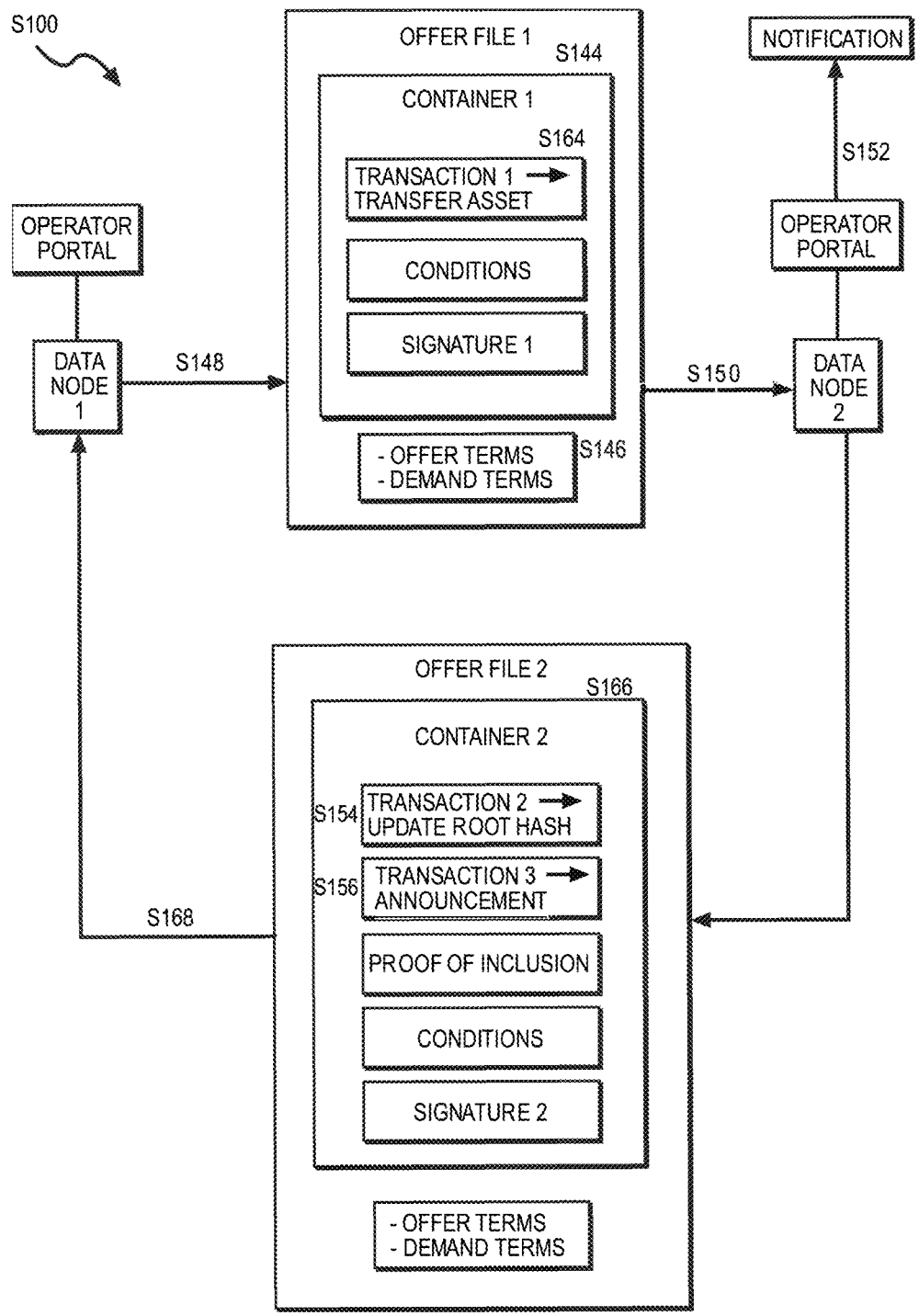
FIG. 5 is a schematic representation of one variation of the method.

As shown in FIGS. 2 and 5, one variation of the method S100 includes, during a first time period, by a first data node in the distributed network, submitting a first transaction to the distributed network in Block S162, the first transaction configured to generate a first blockchain object in a set of blockchain objects, the first blockchain object representing a) a first address associated with the first data node and b) a first amount of an asset.

This variation of the method S100 further includes, during a second time period succeeding the first time period, by the first data node: generating a second transaction in Block S164, the second transaction configured to generate a second blockchain object in the set of blockchain objects, the second blockchain object representing a) a second address associated with a second data node in the distributed network and b) the first amount of the asset, and the second transaction further configured to remove the first blockchain object from the set of blockchain objects; generating a first transaction container in Block S144, the first transaction container a) including the second transaction and b) that is valid based on a first condition characterized by membership of a first data unit hash in a first hash tree, the first data unit hash representing a first data unit, the first hash tree representing a first state of a first structured data object including the first data unit; and transmitting a first offer file including the first transaction container to the second data node in Block S150.

1.5 Variation: Offering to Update a Blockchain Object

As shown in FIGS. 1B, 2, and 3, one variation of the method S100 includes, by a first data node in the distributed network: generating a first hash tree representing a first structured data object including a first data unit in Block S116, the first hash tree including a) a first root hash and b) a first data unit hash representing the first data unit; accessing a non-interactive proof of inclusion representing membership of the first data unit hash within the first hash tree in Block S134; generating a transaction configured to generate a blockchain object including the first root hash in Block S140; and transmitting the transaction and the non-interactive proof of inclusion to a second data node in the distributed network in Block S148.

2. Applications

Generally, Blocks of the method S100 can be executed by a population of nodes (e.g., computing devices) in a distributed network to: initialize a blockchain object including information representing a structured data object (e.g., table, private database); update information stored in the blockchain object based on modifications to the structured data object; and verify data included in the structured data object based on the updated information included in the blockchain object. More specifically, Blocks of the method S100 can be executed by nodes to: generate a first hash tree representing a state of the private structured data object, the first hash tree a) compressing the state of the structured data object into a size that is storable within a blockchain object on the blockchain and b) obfuscating contents of the state of the structured data object from public inspection; and generate a blockchain object including a first hash root of the first hash tree.

Accordingly, Blocks of the method S100 can be executed by nodes to: access a copy (or copies) of the structured data object; compare a second root hash of a second hash tree representing the copy of the structured data object to the first root hash included in the blockchain object; and verify accuracy and completeness of the copy of the structured data object based on a match between the second root hash and the first root hash. Therefore, by storing a root hash—of a hash tree representing the structured data object—in a blockchain object, a node can secure the structured data object on a public blockchain while obfuscating contents of the structured data object from public inspection.

Additionally, Blocks of the method S100 can be executed by nodes to: access a change list representing a set of modifications (e.g., an update of a purchase order from an "offered" state to an "accepted" state) between a first state of a structured data object to a second state of the structured data object; generate a hash tree representing the second state of the structured data object, the hash tree including a hash root; generate a change list hash representing the change list; and submit a transaction configured to a) generate a blockchain object including the root hash and the change list hash and b) transfer an amount of an asset (e.g., an amount of a cryptocurrency corresponding to the purchase order) to an address. Accordingly, Blocks of the method S100 can be executed by nodes to: generate a blockchain object representing acceptance of a purchase order; and transfer the amount of the asset in accordance with the purchase order. Therefore, these nodes can secure the transaction (i.e., transfer of the amount of the asset) and information about the transaction (i.e., acceptance of the purchase order) on the blockchain, while obfuscating contents of the transaction from public inspection.

Furthermore, Blocks of the method S100 can be executed by nodes to: access a non-interactive proof of inclusion of a data unit hash within a hash tree; and submit a transaction to trigger a blockchain object to generate an announcement—representing membership of the data unit hash within the hash tree—based on the non-interactive proof of inclusion. Accordingly, Blocks of the method S100 can be executed by nodes to utilize the generated announcement as a condition to execute data-dependent transactions and/or smart contracts.

In one example application, Blocks of the method S100 can be executed by a first node and a second node to execute an atomic update—of two blockchain objects—representing a transfer of ownership of carbon credits between two parties. More specifically, Blocks of the method S100 can be executed by a first node and a second node to: generate respective structured data objects each representing each party's ledger of carbon credits; generate respective blockchain objects representing these structured data objects;

generate a set of data-dependent transactions to update these blockchain objects to represent each party's commitment to updating the respective structured data objects based on the transfer of ownership of carbon credits; access a set of proofs of inclusion upon which the set of data-dependent transactions rely; package the set of data-dependent transactions and the set of proofs of inclusion into a transaction container; and submit the transaction container to the distributed network for validation and inclusion on a blockchain. Therefore, the first node and the second node can secure the set of data-dependent transactions-representing transfer of ownership of carbon credits—on a public blockchain for verification and/or audit.

The method S100 as described herein is executed by nodes to: submit and validate a transaction that is dependent on an announcement generated by a blockchain object based on a non-interactive proof of inclusion. However, nodes in a distributed network can similarly execute Blocks of the method S100 to submit and validate a transaction that is dependent on multiple announcements respectively generated by multiple blockchain objects based on multiple respective proofs of inclusion.

Additionally, the method S100 as described herein is executed by nodes to: access a non-interactive proof of inclusion of a data unit hash within a hash tree; and submit a transaction to trigger a blockchain object to generate an announcement-representing membership of the data unit hash within the hash tree-based on the non-interactive proof of inclusion. However, nodes in a distributed network can similarly execute Blocks of the method S100 to: access a non-interactive proof of inclusion of a data unit within a structured data object; and submit a transaction to trigger a blockchain object to generate an announcement-representing membership of the data unit within the structured data object-based on the non-interactive proof of inclusion. Furthermore, nodes in a distributed network can similarly execute Blocks of the method S100 to: access a non-interactive proof of absence of a data unit within a structured data object; and submit a transaction to trigger a blockchain object to generate an announcement-representing absence of the data unit within the structured data object-based on the non-interactive proof of absence.

2.1 Definitions

Generally, a "cryptographic hash function" as referred to herein is a one-way deterministic function that maps data to a bit array of a fixed size.

Generally, a "hash tree" as referred to herein is tree in which every "leaf" node is labelled with a cryptographic hash of a data unit, and every inner node is labelled with a cryptographic hash of the labels of its child nodes.

Generally, a "root hash" as referred to herein is a hash value generated from incremental hashing of the leaf nodes of the hash tree via the inner nodes.

Generally, a "data unit hash" as referred to herein is hash value generated from passing a data unit through a cryptographic hash function.

Generally, a "peer hash" as referred to herein is one hash value of a pair of hash values corresponding to a pair of child nodes of an inner node in a hash tree.

Generally, a "mempool" as referred to herein is a collection of pending transactions stored (e.g., in memory) by a full node (and/or by a set of full nodes) for confirmation and inclusion in a subsequent block on the blockchain.

3. Blockchain Structure

Generally, a distributed network includes nodes (e.g., computing devices) interconnected through a communication medium (e.g., the Internet, a wide area network, a local area network). Each node in the distributed network can: maintain a copy of a decentralized database (or "blockchain"); and participate in forming a trustless consensus regarding a state of the decentralized database.

Generally, a blockchain describes a data structure including a series of blocks. A block can include a set of transactions between addresses representing entities utilizing the blockchain. For example, these transactions can include cryptocurrency transactions and/or smart contracts that enforce specific node behavior.

3.1 Full Nodes and Data Nodes

Generally, a distributed network can include: a set of full nodes configured to execute a consensus protocol to extend a public blockchain (e.g., a proof-of-space-based blockchain); and a set of data nodes configured to monitor a state of the public blockchain.

In one implementation, the set of full nodes can generate and add new blocks to the public blockchain. For example, the set of full nodes can generate and add new blocks to the public blockchain based on a proof-of-space.

More specifically, each full node in the set of full nodes can maintain a respective memory pool (hereinafter "mempool") including pending transactions for inclusion on the blockchain. The full node can receive transactions from the distributed network; validate the transactions; and add valid transactions to the respective mempool for inclusion in the blockchain. In particular, the full node can omit invalid transactions from the mempool, thus preventing inclusion of the invalid transactions in the blockchain. The full node can then: select a set of transactions from a mempool of pending transactions; and generate a new block including the set of transactions; and add the new block to the blockchain.

In another implementation, the set of data nodes can monitor the public blockchain and track a set of extant blockchain objects, including a blockchain object representing a private structured data object maintained and utilized by the set of data nodes. More specifically, a data node can: initiate and/or update a private structured data object (e.g., database, table); and submit a transaction to generate the blockchain object to secure the private structured data object on the public blockchain. The set of data nodes (and/or a subset of data nodes) can utilize the blockchain object to verify the private structured data object. Additionally or alternatively, the set of data nodes can submit transactions that are dependent on a state the blockchain object, as described below.

3.2 Blockchain Objects

Generally, a first data node in the distributed network can submit a transaction to generate a blockchain object (e.g., singleton) representing a private structured data object. A second data node (or a full node) in the distributed network observing the blockchain can: detect the blockchain object in a set of blockchain objects (e.g., a set of extant blockchain objects); and identify information associated with the private structured data object based on the blockchain object.

Generally, a node can submit a transaction to generate a blockchain object including program code. A node (e.g., the first data node, the second data node, a full node) can then submit a transaction that executes the program code in the blockchain object. For example, the node can submit a transaction, including a set of input parameters, that executes the program code according to the set of input parameters (e.g., a state of another blockchain object, communication between blockchain objects, announcements). Accordingly, nodes in the distributed network can generate blockchain objects and/or transactions that implement dependencies on other blockchain objects and/or other transactions, as described below.

4. Structured Data Objects

Blocks of the method S100 recite: generating a hash tree representing a state of a structured data object in Block S102, the first hash tree including a root hash; and submitting a transaction to the distributed network, the transaction configured to generate a blockchain object in a set of blockchain objects in Block S104, the blockchain object including the first root hash.

Generally, a data node can: access a state (e.g., a current state) of a structured data object; generate a hash tree representing the state of the structured data object; and submit a transaction to generate a blockchain object representing the state of the structured data object. Additionally, a data node can: generate a puzzle hash representing program code and/or a set of permissions associated with the blockchain object; and submit the transaction to generate the blockchain object including the puzzle hash.

4.1 Structured Data Object Access

In one implementation, a data node can access a state of a structured data object (e.g., database, table) including a set of data units (e.g., a set of rows). For example, a first data node can access (or generate) a first state of a first structured data object including a first set of data units (e.g., a first set of data units including zero or more data units). In this example, the first data node can access (or generate) a first state of a first structured data object owned and/or controlled by the first data node.

4.2 Hash Tree Generation

Generally, a data node can generate a hash tree representing a state of a structured data object including a set of data units. More specifically, the data node can: define an order for the set of data units; generate a set of data unit hashes representing the set of data units; and generate a hash tree based on the set of data unit hashes, the hash tree including a) a root hash and b) the set of data unit hashes as leaf nodes of the hash tree.

In one implementation, the data node can order the set of data units in a structured data object. For example, the data node can order the set of data units according to a predefined order for data units. Therefore, any data node can generate the same version of a hash tree for the structured data object by ordering the set of data units according to the predefined order.

In another implementation, the data node can generate a set of data unit hashes representing the set of data units based on a cryptographic hash function (e.g., SHA-2, SHA-256). For example, the data node can generate a first data unit hash representing a first data unit in the set of data units. In this example, the data node can generate the first data unit hash representing the first data unit based on a secure hash algorithm. The data node can then repeat this process to generate a respective data unit hash for each data unit in the set of data units in the structured data object.

In one variation, the data node can order the set of data unit hashes according to a predefined order. More specifically, the data node can: generate a respective data unit hash for each data unit in the set of data units; and sort these data unit hashes according to a predefined order in response to generating the data unit hashes. Therefore, any data node can generate the same version of a hash tree for the structured data object by ordering the set of data unit hashes according to the predefined order.

In one implementation, in Block S102, the data node can generate a hash tree representing the structured data object. More specifically, the data node can generate a hash tree based on the set of data unit hashes based on the predefined order. For example, during a first time period, the data node can generate a first hash tree (e.g., Merkle Tree) based on a cryptographic hash function (e.g., SHA-256).

In one implementation, the data node can generate the hash tree including: the set of data unit hashes; a set of intermediate hashes; and a root hash. In this implementation, the data node generates the hash tree including: each data unit hash in the set of data unit hashes as a respective leaf node of the hash tree, and each intermediate hash as an inner node of the hash tree. More specifically, each intermediate hash is characterized by a hash value representing a) a first hash value corresponding to a first child of the intermediate hash and b) a second hash value corresponding to a second child of the intermediate hash.

4.3 Blockchain Object Instantiation

In Block S104, the data node can submit a transaction to the distributed network, the transaction configured to generate a blockchain object in a set of blockchain objects. More specifically, the data node can submit the transaction to a set of full nodes in the distributed network for validation and inclusion in a subsequent block of the blockchain.

In one implementation, during a first time period, the data node can submit a transaction configured to generate a blockchain object including a root hash of a hash tree representing a state of a structured data object. Therefore, by submitting the transaction to generate a blockchain object including the root hash, the data node can represent the structured data object in a sufficiently small size to include on a public blockchain while obfuscating contents of the structured data object from public inspection.

In one variation, the data node can submit a transaction configured to generate a blockchain object including the tree hash. In this variation, the data node can submit the transaction configured to generate the blockchain object including the tree hash representing the state of the structured data object, the tree hash including: a set of data unit hashes; a set of intermediate hashes; and a root hash.

Additionally, the data node can submit a transaction including a signature associated with an identifier (e.g., decentralized identifier, address, public key) corresponding to the data node.

In another implementation, the data node can submit the transaction further configured to spend a genesis coin (e.g., valued at a minimum allowable denomination of a cryptocurrency) to initiate the blockchain object on the blockchain, the genesis coin including a launcher identifier (or "launcher ID") uniquely identifying the blockchain object. In this implementation, the data node submits the transaction configured to generate the blockchain object including the launcher ID. For example, the data node submits the transaction configured to generate the blockchain object including the puzzle hash representing the launcher ID.

4.3.1 Puzzle Hash

Generally, a data node can submit a transaction to generate a blockchain object including a puzzle hash representing program code (or a "puzzle"), the program code defining behavior of the blockchain object. More specifically, the data node can submit a transaction to generate a blockchain object including a puzzle hash representing program code defining behavior of the blockchain in response to another transaction acting upon the blockchain object.

In one example, a data node can submit a transaction to generate a blockchain object including a puzzle hash representing program code that executes according to a set of input parameters (e.g., a set of input parameters included in another transaction acting upon the blockchain object). Accordingly, the data node can generate the blockchain object that a) implement dependencies on other blockchain objects and/or transactions and b) is a dependency for other blockchain objects and/or transactions.

4.3.2 Permissions

Generally, a data node can submit a transaction configured to generate a blockchain object further including a set of permissions (e.g., write permissions, read permissions) associated with the blockchain object.

In one implementation, the data node can submit the transaction configured to generate the blockchain object further including a first set of identities permitted read access to the blockchain object. More specifically, the data node can submit the transaction configured to generate the blockchain object further including a first set of identities permitted to detect a state of the blockchain object.

For example, the data node can submit the transaction configured to generate the blockchain object further including a first set of identities permitted to detect a hash root (and/or other data) included in the blockchain object. In this example, the data node can submit the transaction configured to generate the blockchain object further including the first set of identities, the first set of identities including an identifier (e.g., decentralized identifier, address, public key, signature) associated with a second data node in the distributed network.

In another implementation, the data node can submit the transaction configured to generate the blockchain object further including a second set of identities permitted write access to the blockchain object. More specifically, a data node can submit the transaction configured to generate the blockchain object further including a second set of identities permitted to modify a state of the blockchain object.

For example, a first data node can submit the transaction configured to generate a blockchain object further including a second set of identities permitted to: modify the hash root (and/or other data) included in the blockchain object; modify the first set of identities permitted read access to the blockchain object; modify the second set of identities permitted write access to the blockchain object; and/or modify a puzzle hash representing a puzzle defining behavior of the blockchain object. In this example, the first data node can submit the transaction configured to generate the blockchain object further including the second set of identities, the second set of identities including a first identifier (e.g., decentralized identifier, address, public key, signature) associated with the first data node. Additionally, the first data node can submit the transaction configured to generate the blockchain object further including the second set of identities including a second identifier associated with a second data node in the distributed network.

In one implementation, the data node can submit the transaction configured to generate the blockchain object including a puzzle hash, the puzzle hash representing: the first set of identities permitted read access to the blockchain object; and the second set of identities permitted write access to the blockchain object.

4.3.2.1 Permission Blockchain Object

In one variation, a data node can submit the transaction configured to generate a first blockchain object including a first set of identities permitted read access to the first blockchain object, the first set of identifies including a first identifier of a second blockchain object (or a "permission blockchain object") that must be "spent" in a transaction to detect a state of the first blockchain object. In this variation, the data node (or another node in the distributed network) can generate the second blockchain object including a third set of identities permitted to spend the second blockchain object in a transaction.

Similarly, the data node can submit the transaction configured to generate the first blockchain object including a second set of identities permitted write access to the first blockchain object, the second set of identifies including a second identifier of a third blockchain object (or a "permission blockchain object") that must be spent in a transaction to modify a state of the first blockchain object, the third blockchain object including a fourth set of identities permitted to spend the third blockchain object in a transaction.

4.4 Transaction Validation

Generally, a full node in the distributed network can: receive the transaction, from the data node, to generate the blockchain object; validate the transaction; add the validated transaction to a mempool associated with the full node; generate a block including the validated transaction from the mempool; and append the block to the blockchain. Accordingly, a node can thus observe the blockchain object on the blockchain and/or submit transactions dependent on the blockchain object, as described below.

5. Structured Data Object Read and Verification

Generally, a node in the distributed network can: access a state of a structured data object including a set of data objects; identify a blockchain object in a set of blockchain objects, the blockchain object including a root hash of a hash tree representing the state of the structured data object; and verify the state of the structured data object based on the root hash.

In one implementation, a second data node can access (e.g., read) a structured data object (e.g., a structured data object generated and/or controlled by a first data node) including a set of data units. The second data node can then: identify a blockchain object in a set of blockchain objects (e.g., a set of extant blockchain objects in a current state of the blockchain) corresponding to the structured data object; access a first root hash included in the blockchain object; and verify the structured data object based on the root hash.

For example, the second data node can: generate a second hash tree corresponding to the structured data object, the second hash tree including a second hash root; compare the second hash root to the first hash root; and verify the structured data object based on a match between the second hash root and the first hash root.

6. Structured Data Object Mirror and Verification

Blocks of the method S100 recite: generating a third state of a second structured data object based on the first state of the first structured data object in Block S106; identifying the first blockchain object in the set of blockchain objects in Block S1108; accessing the first root hash in the first blockchain object in Block S110; and verifying the third state of the second structured data object matches the first state of the first structured data object based on the first root hash in Block S112.

Generally, a second data node can track (or "subscribe") a first structured data object, such as a structured data object generated and/or controlled by a first data node. More specifically, the second data node can generate a second structured data object based on a first structured data object. Accordingly, the second data node can generate and/or maintain second structured data object corresponding to a copy (or "mirror") of the first structured data object.

In one implementation, in Block S110, during a second time period succeeding a first time period (i.e., during a second time period succeeding a first time period in which a first data node generates a first state of a first structured data object) the second data node can: access (e.g., read) the first state of the first structured data object; and generate a second state of a second structured data object based on the first state of the first structured data object. For example, the second data node in the distributed network can download a copy of the first state of the first structured data object to generate the second state of the second structured data object. The second data node can then: identify a blockchain object in a set of blockchain objects (e.g., a set of extant blockchain objects in a current state of the blockchain) corresponding to the structured data object in Block S108; and access a first root hash included in the blockchain object in Block S110.

In another implementation, in Block S112, the data node can verify the structured data object based on the root hash. For example, the second data node can: generate a second hash tree corresponding to the structured data object, the second hash tree including a second hash root; compare the second hash root to the first hash root; and verify the structured data object based on a match between the second hash root and the first hash root.

Accordingly, by utilizing a root hash stored in a blockchain object corresponding to a structured data object, a data node can generate and maintain a mirror of the structured data object that can be verified as an accurate and complete copy of the structured data object. Therefore, a data node can secure the structured data object (e.g., private structured data object) on a public blockchain while obfuscating contents of the structured data object.

In one variation, a second data node can track (or "subscribe") a portion of the first structured data object including a set of data units. For example, the second data unit can subscribe to (or access) a subset of data units in the set of data units. The second data unit can then generate the second structured data object including the subset of data units. Additionally, the second data node can verify the subset of data units based on a proof of inclusion and/or an announcement, as described below.

7. Structured Data Object Update

Blocks of the method S100 recite: inserting a first data unit in the first state of the first structured data object in Block S14; generating a second hash tree representing a second state of the first structured data object including the first data unit in Block S116, the second hash tree including a second root hash; and submitting a second transaction to the distributed network in Block S122, the second transaction configured to generate a second blockchain object in the set of blockchain objects, the second blockchain object including the second root hash.

Generally, a data node can: update a state of a structured data object; generate a hash tree representing the state (e.g., the updated state) of the structured data object, the hash tree including an updated hash root; and submit a transaction to the distributed network, the transaction configured to generate a blockchain object including the updated hash root.

For example, during a second time period succeeding a first time period (i.e., during a second time period succeeding a first time period in which a first data node generates a first state of a first structured data object), the data node (e.g., the first data node, another data node permitted write access to the first structured data object) can: insert a first data unit in the first state of the first structured data object; generate a second hash tree representing a second state of the first structured data object including the first data unit, the second hash tree including a second root hash; and submit a second transaction to the distributed network, the second transaction configured to generate a second blockchain object in the set of blockchain objects, the second blockchain object including the second root hash.

In one implementation, in Block S114, the data node can insert a first data unit into a first state of a first structured data object. More specifically, the data node can insert a first data unit into a first state of a first structured data object to generate a second state of the first structured data object, the second state of the first structured data object including the first data unit.

Additionally or alternatively, the data node can remove a second data unit from the first state of the first structured data object. More specifically, the data node can remove a second data unit from the first state of the first structured data object to generate the second state of the first structured data object, the second state of the first structured data object omitting the second data unit.

In one implementation, in Block S116, the data node can generate a second hash tree representing the second state of the first structured data object, the second hash tree including: a second root hash; and a first data unit hash representing the first data unit. For example, the data node can generate the second hash tree in an analogous (e.g., similar, identical) manner as described above in connection with generating the hash tree.

Additionally, the data node can generate the second hash tree further including a set of data unit hashes corresponding to a second set of data units included in the second state of the first structured data object.

In another implementation, in Block S122, the data node can submit a transaction to the distributed network, the transaction configured to generate a second blockchain object in the set of blockchain objects, the second blockchain object including the second root hash. More specifically, the data node can submit the transaction configured to: generate the second blockchain object based on the first blockchain object; and remove the first blockchain object from the set of blockchain objects. Additionally, the data node can submit the transaction including a signature associated with the first data node. Accordingly, the first data node spends the first blockchain object and generates a second blockchain object based on the first blockchain object (or "regenerates" the first blockchain object as the second blockchain object).

In this implementation, the data node can submit the transaction configured to generate the second blockchain object including: a puzzle hash included in the first blockchain object; a set of permissions (e.g., read permissions, write permissions) included in the first blockchain object; and/or a parent identifier associated with the first blockchain object. In one example, the data node can submit the transaction configured to generate the second blockchain object including a first set of identities (e.g., a first identifier associated with a second data node subscribing to the structured data object) permitted read access to the second blockchain object; and a second set of identities (e.g., a second identifier associated with the data node generating the second blockchain object) permitted write access to the second blockchain object. In another example, the data node can submit the transaction configured to generate the second blockchain object including a parent identifier based on the launcher ID of the genesis coin spent to generate the first blockchain object. In yet another example, the data node can submit the transaction configured to generate the second blockchain object including a puzzle hash representing the set of permissions and the parent identifier. Accordingly, the first data node can generate the second blockchain object defining the same behavior (i.e., program code) and set of permissions as the first blockchain object.

The data node can submit this transaction configured to generate the second blockchain object, and then a full node (or a set of full nodes) in the distributed network can validate and add the transaction in a subsequent block in the blockchain, such as in an analogous manner as described above in connection with submitting the first transaction to generate the first blockchain object.

7.1 Change List

Blocks of the method S100 recite: generating a change list representing a set of modifications between the first state of the first structured data object and the second state of the first structured data object in Block S118; and generating a change list hash representing the change list in Block S120.

Generally, a data node can: generate a change list representing a set of modifications (e.g., insertion of a first data unit, removal of a second data unit) between a first state of the structured data object and a second state of the structured data object; generate a change list hash representing the change list.

In one implementation, in Block S118, the data node can generate a change list representing a set of modifications between the first state of the first structured data object and the second state of the first structured data object. In one example, the data node can generate the change list including a first element representing insertion of the first data unit into the first state of the first structured data object. In another example, the data node can generate the change list including a second element representing removal of the second data unit from the first state of the first structured data object. In yet another example, the data node can generate the change list based on a set of modifications between the first state of the first structured data object and the second state of the first structured data object, the set of modifications received via an application programming interface (hereinafter "API").

In another implementation, in Block S120, the data node can generate a change list hash representing the change list. For example, the data node can: generate a first element hash representing the first element representing insertion of the first data unit into the first state of the first structured data object; and generate a second element hash representing the second element representing removal of the second data unit from the first state of the first structured data object. In this example, the data node can generate the change list hash, the first element hash, and/or the second element hash based on a cryptographic hash function (e.g., SHA-256). The data node can then submit the transaction configured to generate the second blockchain object including the change list hash.

Accordingly, by generating the second blockchain object including the change list hash, the data node can record specific changes made to the structured data object that can be observed on the blockchain and/or be verified by other nodes in the distributed network.

In one variation, the data node can generate the change list hash characterized by a hash tree representing the change list. In this variation, the data node can generate the change list hash characterized by a change list hash tree representing the change list, the change list hash tree including: a set of change list element hashes corresponding to a set of change list elements; and a change list root hash. The data node can then submit the transaction configured to generate the second blockchain object including the change list hash tree and/or the change list root hash.

A full node (or a set of full nodes) in the distributed network can then validate and add the transaction in a subsequent block in the blockchain as described above.

8. Structured Data Object Mirror Update

Blocks of the method S100 recite: generating a fourth state of the second structured data object based on the third state of the second structured data object and the change list in Block S126; identifying the second blockchain object in the set of blockchain objects in Block S128; accessing the second root hash and the change list hash in the second blockchain object in Block S130; and verifying the fourth state of the second structured data object based on the second root hash and the change list hash in Block S132.

Generally, a second data node can: update a copy of a structured data object based on a change list; identify a blockchain object corresponding to a current state the structured data object; access a root hash and/or change list hash in the blockchain object; and verify the updated copy of the structured data object based on the root hash and/or the change list hash.

For example, during a fourth time period succeeding the second time period and the third time period (i.e., during a fourth time period succeeding: a) a second time period in which a first data node updates a structured data object from a first state to a second state; and b) a third time period in which a second data node generates a copy of the first state of the structured data object), the second data node can: generate a fourth state of the second structured data object based on the third state of the second structured data object and the change list; identify the second blockchain object in the set of blockchain objects; access the second root hash and the change list hash in the second blockchain object; and verify the fourth state of the second structured data object based on the second root hash and the change list hash.

8.1 Accessing a Change List

Generally, a data node subscribing to a structured data object can access a change list including a set of modifications between a first state of a structured data object and a second state of the structured data object.

In one implementation, a data node can execute a gossip protocol with other data nodes (e.g., other data nodes subscribed to the structured data object) in the distributed network in order to: observe modifications to the structured data object (e.g., observe the modifications over a predefined time period); and aggregate the observed modifications between these data nodes to generate the change list including the set of modifications. The data node can then access the change list representing the aggregated set of modifications in Block S124.

For example, a data node can access a change list representing a set of modifications, the set of modifications representing: an insertion of a data unit; a removal of a data unit; a translation of a data unit; and other any other modification.

In one implementation, in Block S126, a data node can generate a fourth state of the second structured data object (i.e., update a copy of the structured data object) based on the third state of the second structured data object and the change list. In this implementation, the data node can update a prior state (e.g., the third state) of the second structured data object utilizing the set of modifications included in the change list to generate an updated state (e.g., the fourth state) of the second structured data object.

8.2 Structured Data Object Update Verification

Generally, a data node subscribing to a first structured data object can verify a local copy of the first structured data object based on based on a root hash and/or a change list hash included in a blockchain object corresponding to the structured data object.

In one implementation, in Block S132, the data node can verify the fourth state of the second structured data object based on the second root hash. For example, a second data node can verify the fourth state of the second structured data object based on the second root hash included in the second blockchain object. More specifically, the second data node can: identify the second blockchain object corresponding to the first structured data object; access a second hash included in the second blockchain object; generate a third hash tree corresponding to the fourth state of the second structured data object, the third hash tree including a third hash root; compare the third hash root to the second hash root; and verify the fourth state of the second structured data object based on a match between the third hash root and the second hash root.

In one variation, in Block S132, the data node can verify the fourth state of the second structured data object based on the second root hash and the change list hash. For example, the data node can verify the fourth state of the second structured data object based on the second root hash as described above. In this example, the data node can then verify the accessed change list based on the change list hash included in the second blockchain object. More specifically, the data node can: access the change list including the set of modifications; generate a second change list hash representing the accessed change list; compare the second change list hash to the change list hash included in the second blockchain object; and verify the fourth state of the second structured data object based on a match between the second change list hash and the change list hash included in the second blockchain object.

Therefore, as a data node updates a structured data object, other data nodes subscribing to the structured data object can verify accuracy and completeness of local copies of the structured data object based on information included in the blockchain object.

9. Example: Shared Access Structured Data Objects

In one example implementation, a first data node associated with a purchaser can collaborate with a second data node associated with a supplier to transact on a batch of goods. Generally, the first data node and the second data node can execute Blocks of the method S100 to: generate structured data objects; submit transactions to generate blockchain objects corresponding to these structured data objects; modify data units included in the structured data objects; and submit transactions to generate (or update) blockchain objects corresponding to the updated structured data objects.

During a first time period, the first data node can generate a) a first structured data object representing a set of purchase orders and b) a second structured data object representing a set of transactions. More specifically, the first node can: generate a first state of the first structured data object including a first data unit representing a first purchase order; and generate a second state the second structured data object including a second data unit representing a first transaction, the second data unit including a first data unit hash representing the first data unit.

Accordingly, the first data node can represent the first structured data object and the second structured data object in a star schema, the second structured data object referencing the first structured data object.

In this example, the first data node can: allocate read/write access to the first structured data object to the first data node; and allocate read access to the first structured data object to the second data node. Additionally, the first data node can: allocate read/write access to the second structured data object to the first data node; and allocate read/write access to the first structured data object to the second data node.

The first data node can: generate a first hash tree representing the first state of the first structured data object, the first hash tree including a first root hash; submit a first transaction to the distributed network, the first transaction configured to generate a first blockchain object in a set of blockchain object, the first blockchain object including a) the first root hash, b) a first set of identities (e.g., a first identifier associated with the first data node, a second identifier associated with the second data node) permitted read access to the first blockchain object, and c) a second set of identities (e.g., the first identifier associated with the first data node) permitted write access to the first blockchain object.

Similarly, the first data node can: generate a second hash tree representing the second state of the second structured data object, the second hash tree including a second root hash; submit a second transaction to the distributed network, the second transaction configured to generate a second blockchain object in the set of blockchain objects, the second blockchain object including a) the second root hash, b) a third set of identities (e.g., the first identifier associated with the first data node, the second identifier associated with the second data node) permitted read access to the second blockchain object; and a fourth set of identities (e.g., the first identifier associated with the first data node, the second identifier associated with the second data node) permitted write access to the second blockchain object.

In this example, the first data node can submit the first transaction and the second transaction each including a signature corresponding to the first identifier associated with to the first data node.

In one variation, rather than independently submitting the first transaction and the second transaction to the distributed network, the first data node can combine the first transaction and the second transaction into a third transaction and submit the third transaction to the distributed network. In this variation, the first data node can submit the third transaction including a signature corresponding to the first identifier associated with to the first data node.

A full node (or a set of full nodes) in the distributed network can then validate and add the transaction in a subsequent block in the blockchain as described above.

9.1 Example: Purchase Agreement

During a second time period succeeding the first time period (e.g., in response to an agreement between the purchaser and the supplier to purchase goods via a second purchase order), the first data node can: insert a third data unit to the first state of the first structured data object (i.e., to result in a third state of the first structured data object including the third data unit), the third data unit representing the second purchase order; generate a third hash tree representing to the third state of the first structured data object, the third hash tree including a third root hash; and submit a fourth transaction to the distributed network, the fourth transaction configured to generate a third blockchain object in the set of blockchain objects based on the first blockchain object, the third blockchain object including the third root hash. More specifically, the first data node can submit the fourth transaction configured to: generate the third blockchain object based on the first blockchain object; and remove the first blockchain object from the set of blockchain objects (i.e., spend the first blockchain object).

Similarly, the first data node can insert a fourth data unit to the second state of the second structured data object (i.e., to result in a fourth state of the second structured data object including the fourth data unit), the fourth data unit representing a second transaction associated with the second purchase order in an "offered" state, the fourth data unit including a fourth data unit hash representing the third data unit. The first data node can then: generate a fourth hash tree representing to the fourth state of the second structured data object, the fourth hash tree including a fourth root hash; and submit a fifth transaction to the distributed network, the fifth transaction configured to a) generate a fourth blockchain object in the set of blockchain objects based on the second blockchain object, the fourth blockchain object including the fourth root hash, and b) remove the second blockchain object from the set of blockchain objects (i.e., spend the second blockchain object).

Generally, the second data node can verify the updates to the structured data objects and the corresponding blockchain objects. For example, the second data node can: verify the third state of the first structured data object based on the third root hash included in the third blockchain object; and verify the fourth state of the second structured data object based on the fourth root hash included in the fourth blockchain object. Therefore, the second data node can confirm that the updates to the structured data objects and the blockchain objects are in accordance with the second purchase order agreed upon.

During a third time period succeeding the second time period, the second data node can: insert a fifth data unit in the fourth state of the second structured data object (i.e., to result in a fifth state of the second structured data object), the fifth data unit representing the second transaction associated with the second purchase order in the "accepted" state; and remove the fourth data unit from the fourth state of the second structured data object. Alternatively, the second data node can modify the fourth data unit to represent the second transaction associated with the second purchase order in an "accepted" state.

The second data node can then: generate a fifth hash tree representing the fifth state of the second structured data object, the fifth hash tree including the fifth root hash; and submit a sixth transaction to the distributed network, the sixth transaction configured to a) generate a fifth blockchain object in the set of blockchain objects based on the fourth blockchain object, the fifth blockchain object including the fifth root hash, and b) remove the fourth blockchain object from the set of blockchain objects (i.e., spend the fourth blockchain object).

Accordingly, by executing Blocks of the method S100 to update structured data objects and corresponding blockchain objects, the first data node and second data node can secure a record of the purchase agreement on a public blockchain, while obfuscating contents of the purchase agreement from public inspection.

10. Data-Dependent Transaction

Generally, a data node can submit a transaction to the distributed network to execute a smart contract based on a particular data unit within a structured data object. More specifically, the data node can: access the structured data object (or a copy of the structured data object): identify the particular data unit included in the structured data object; and verify accuracy and completeness of the structured data object based on a root hash and/or a change list hash included in a blockchain object corresponding to the structured data object. The data node can then submit a transaction to execute a smart contract (e.g., transfer an amount of an asset to an address) in response to detecting the particular data unit in the structured data object.

Referring to the "Purchase Agreement" example described above, the second data node can: identify the fourth data unit (i.e., representing the second transaction associated with the second purchase order in an "offered" state) included in the second state of the second structured data object; and submit the sixth transaction to generate the fifth blockchain object (i.e., representing the second data node's update of the second structured data object to an "accepted" state of the second transaction associated with the second purchase order).

Additionally, the second data node can submit the sixth transaction further configured to transfer an amount of an asset (e.g., an amount of a cryptocurrency corresponding to the purchase agreement) to an address associated with the first data node. A full node (or a set of full nodes) in the distributed network can then validate and add the transaction in a subsequent block in the blockchain as described above.

Accordingly, the second data node can submit the sixth transaction configured to a) generate the blockchain object representing the second data node's acceptance of the purchase agreement and b) transfer the amount of the asset in accordance with the purchase agreement. Therefore, the first data node and the second data node can secure the transaction (i.e., transfer of the amount of the asset) and information about the transaction (i.e., acceptance of the second purchase order) on the blockchain, while obfuscating contents of the transaction from public inspection.

11. Announcements

Blocks of the method S100 recite: submitting a first transaction to the distributed network in Block S122, the first transaction configured to generate a blockchain object a) including the root hash and b) configured to generate an announcement representing membership of a data unit hash in the hash tree; accessing a non-interactive proof of inclusion of the data unit hash within the hash tree in Block S134; identifying the blockchain object in a set of objects in Block S128; and submitting a second transaction to the distributed network in Block S136, the second transaction configured to trigger the blockchain object to generate the announcement based on the non-interactive proof of inclusion.

Generally, a data node can submit a transaction to generate a blockchain object that is configured to generate an announcement. More specifically, a data node can submit a transaction to generate a blockchain object that is configured to generate an announcement based on a set of inputs included in the transaction.

For example, a first data node can submit a first transaction generate a blockchain object (e.g., a blockchain object including a hash root of a hash tree) that is configured to generate an announcement based on a set of inputs, the set of inputs including a) a data unit hash and b) a proof of inclusion of the data unit hash within a hash tree. In this example, a data node (e.g., the first data node, a second data node) can: access the proof of inclusion; and identify the blockchain object in a set of blockchain objects. The data node can then submit a second transaction including the data unit hash and the proof of inclusion, the second transaction configured to trigger the blockchain object to: verify the hash root based on the data unit hash and the proof of inclusion; and generate an announcement representing membership of the data unit hash in the hash tree. A full node (or a set of full nodes) in the distributed network can then validate and add the transaction in a subsequent block in the blockchain as described above.

Accordingly, a data node in the distributed network can utilize the announcement as a condition to execute a data-dependent smart contract and/or transaction.

11.1 Blockchain Object Generation

In one implementation, in Block S122, a first data node can submit a first transaction to the distributed network, the first transaction configured to generate a first blockchain object in a set of blockchain objects, the first blockchain object including: a root hash of a hash tree representing a structured data object including a data unit; and a data unit hash representing the data unit. Additionally, the first data node can submit the first transaction further configured to generate the first blockchain object configured to generate an announcement representing membership of the data unit hash in the hash tree (e.g., an announcement of a proof of inclusion of the data unit hash in the hash tree).

In one example, the first data node can submit the first transaction further configured to generate the first blockchain object configured to generate an announcement representing membership of the data unit hash in the hash tree based on a proof of inclusion of the data unit hash within the hash tree.

In another example, the first data node can submit the first transaction further configured to generate the first blockchain object configured to generate the announcement in response to detecting membership of the data unit hash in the hash tree based on a non-interactive proof of inclusion of the data unit hash within the hash tree.

11.2 Proof of Inclusion

Generally, a data node can access a proof of inclusion (e.g., a non-interactive proof of inclusion, a non-interactive zero-knowledge proof of inclusion) representing membership of a data unit hash within a hash tree, the data unit hash representing a data unit the hash tree representing a structured data object including the data unit.

In one implementation, in Block S134, a data node can access a non-interactive proof of inclusion of a data unit hash within a hash tree. More specifically, a data node can access a proof of inclusion including: a data unit hash; and a set of peer hashes along a path in the hash tree from the data unit hash to the root hash.

In another implementation, a data node can access the non-interactive proof of inclusion in response to a request for the non-interactive proof of inclusion.

In one example, a second data node can request a non-interactive proof of inclusion of the data unit hash within the hash tree from a first data node that controls the structured data object and/or generates the hash tree representing the structured data object including the data unit. In this example, the first data node can: receive the request from the second data node; and return the non-interactive proof of inclusion in response to the request.

In another example, a data node can submit a query to an engine (e.g., via HTTP, via API) for a proof of inclusion of a data unit hash within a hash tree. In this example, the engine can receive the query and return the proof of inclusion.

In yet another example, a data node can submit a query to the engine, the query indicating a blockchain object (i.e., a blockchain object representing a structured data object) and a data unit. In this example, the engine can receive the query and return: the data unit; and a non-interactive proof of inclusion representing membership of the data unit within the structured data object.

11.3 Announcement Generation

Generally, a data node can submit a transaction configured to trigger a blockchain object to generate an announcement representing membership of a data unit hash within a hash tree based on a proof of inclusion.

In one implementation, in Block S136, a data node can submit a transaction including a data unit hash and a proof of inclusion of the data unit hash within a first hash tree, the proof of inclusion including the data unit hash and a set of peer hashes along a path in the first hash tree from the data unit hash to a first root hash of the first hash tree. In this implementation, the data node can submit the transaction configured to trigger a blockchain object (i.e., the blockchain object including the first root hash) to generate an announcement representing membership of a data unit hash within the first hash tree based on the proof of inclusion. More specifically, the data node can submit the transaction configured to trigger the blockchain object to verify the second root hash based on the first data unit hash and the set of peer hashes.

For example, the data node can submit the transaction configured to trigger the blockchain object to: recalculate a second hash root based on the data unit hash and the set of peer hashes included in the proof of inclusion; compare the second root hash to the first root hash included in the blockchain object; and, in response to detecting a match between the second root hash and the first root hash, generate the announcement representing membership of the data unit hash within the first hash tree (e.g., an announcement of a proof of inclusion of the data unit hash within the first hash tree).

Accordingly, a data node can execute Blocks of the method S100 to verify membership of a data unit hash within a hash tree based on a proof of inclusion. Therefore, because the data unit hash represents a data unit and the hash tree represents a structured data object, a data node can also verify membership of the data unit within the structured data object based on the proof of inclusion.

In another implementation, a data node submitting a transaction to trigger a first blockchain object to generate an announcement includes spending of the first blockchain object. More specifically, a data node submitting a transaction to trigger a blockchain object to generate an announcement includes: generating a second blockchain object, in a set of blockchain objects, based on the first blockchain object; and removing the first blockchain object from the set of blockchain objects. Additionally, the data node can submit the transaction including a signature associated with the data node. Accordingly, the data node spends the first blockchain object and generates a second blockchain object based on the first blockchain object (or "regenerates" the first blockchain object as the second blockchain object) as described above.

In this implementation, the data node submits the transaction to trigger the first blockchain object to generate an announcement, the transaction characterized as a "read" of the first blockchain object. Therefore, a data node associated with an identifier included in a set of identities permitted read access to the first blockchain object can submit the transaction to trigger the first blockchain object to generate the announcement.

11.4 Announcement-Dependent Transaction

Blocks of the method S100 recite: submitting a second transaction to the distributed network in Block S132, the second transaction configured to generate a second blockchain object in the set of blockchain objects, the second blockchain object configured to transfer an amount of an asset to an address associated with the first data node in response to detecting membership of a first data unit hash in a second hash tree representing a second state of the structured data object including a first data unit, the first data unit hash representing the first data unit; submitting a fourth transaction to the distributed network in Block S136, the fourth transaction configured to trigger the third blockchain object to generate an announcement in response to detecting membership of the first data unit hash in the second hash tree based on the non-interactive proof of inclusion; and submitting a fifth transaction to the distributed network in Block S138, the fifth transaction configured to trigger the second blockchain object to transfer the amount of the asset to the first address based on the announcement.

Generally, a data node can: submit a first transaction to generate a first blockchain object configured to transfer an amount of an asset to an address based on membership of a data unit hash in a hash tree; submit a second transaction configured to trigger a second blockchain object to generate an announcement representing membership of the data unit hash within the hash tree; and submit a third transaction configured to trigger the first blockchain object to transfer the amount of the asset to the address based on the announcement.

In one implementation, in Block S132, a second data node can submit a first transaction configured to generate a blockchain object in the set of blockchain objects, the blockchain object configured to transfer an amount of an asset (e.g., an amount of a cryptocurrency) to an address (e.g., an address associated with a first data node, an address associated with another data node) in response to detecting membership of a data unit hash in a hash tree. For example, the second data node can submit the first transaction to generate the blockchain object configured to transfer the amount of the asset to the address in response to detecting an announcement representing membership of the data unit hash within the hash tree. In one variation, the first data node (or another data node) can submit the first transaction.

In Block S134, the first data node (or another data node) can: access a proof of inclusion of the data unit hash within the hash tree; and submit a second transaction configured to trigger a second blockchain object to generate an announcement representing membership of the data unit hash within the hash tree in Block S136, such as in a manner described above.

In another implementation, in Block S138, the second data node (or another data node) can submit a third transaction configured to trigger the first blockchain object to transfer the amount of the asset to the address based on the announcement. More specifically, the second data node (or another data node) can submit a third transaction configured to trigger the first blockchain object to: detect the announcement representing membership of the data unit hash within the hash tree; and transfer the amount of the asset to the address in response to detecting the announcement.

Additionally, a full node (or a set of full nodes) in the distributed network can validate and add each of the first transaction, the second transaction, and the third transaction in subsequent block(s) of the blockchain as described above.

Accordingly, a data node can execute Blocks of the method S100 to execute a data-dependent transaction based on an announcement that verifiably proves existence of the data upon which the transaction depends.

12. Offers

Generally, a first data node can: generate an offer file including a first provisional transaction (or a first set of provisional transactions); and transmit the offer file to a second data node (or a set of data nodes) in the distributed network. More specifically, the first data node can generate the offer file including a first provisional transaction that is valid based on a condition (or a set of conditions). In one example, the first data node can generate the offer file including a provisional transaction that is valid based on a condition characterized by membership of a particular data unit hash in a structured data object (i.e., membership of a particular data unit hash in a hash tree). In another example, the first data node can generate the offer file including a provisional transaction that is valid based on a condition characterized by an announcement representing membership of the particular data unit hash within the hash tree (e.g., an announcement of a proof of inclusion of the particular data unit hash within the hash tree), In yet another example, the first data node can generate the offer file including a provisional transaction that is valid based on a condition characterized by receipt of a proof of inclusion of a particular data unit hash in a hash tree. In yet another example, the data node can generate the offer file including a provisional transaction that is valid based on a second condition characterized by a transfer of an amount of an asset (e.g., an amount of a cryptocurrency) to an address (e.g., an address associated with the data node, an address associated with another data node).

In response to receiving an offer file, a second data node can generate a second provisional transaction (or a second set of provisional transactions) that fulfills the condition(s) of the first provisional transaction (or the first set of provisional transactions) in the offer file. Additionally, the second data node can generate the second provisional transaction based on a condition (or a set of conditions). For example, the second data node can generate the second provisional transaction based on a condition that is fulfilled by the first provisional transaction. In this example, the second data node can then transmit the first provisional transaction and the second provisional transaction to the distributed network for validation and inclusion in a subsequent block in the blockchain. Accordingly, because respective conditions of the first provisional transaction and the second provisional transaction and mutually fulfilled by these transactions, a full node (or a set of full nodes) can validate and add each of these transactions in subsequent block(s) of the blockchain as described above.

13. Example: Two-Party Atomic Blockchain Object Update

As shown in FIGS. 1A, 1B, 2, and 3, In one example implementation, a first data node and a second data node can execute Blocks of the method S100 to execute an atomic update of two blockchain objects. In this example implementation, the first data node can offer to modify a first structured data object to include a first data unit if and only if the second data node modifies a second structured data object to include a second data unit. More specifically, the first data node can offer to modify a first structured data object to include a first data unit (e.g., a first data unit representing debit of an amount of an asset) if and only if the second data node modifies a second structured data object to include a second data unit (e.g., a second data unit representing credit of the amount of the asset). Alternatively, the first data node can offer to modify a first structured data object to include a first data unit representing credit of an amount of an asset (e.g., a quantity of carbon credits) if and only if the second data node modifies a second structured data object to include a second data unit representing debit of the amount of the asset.

Accordingly, the first data node and the second data node can execute Blocks of the method S100 to: represent an agreement between a first party associated with the first data node and a second party associated with the second data node (e.g., a transfer of a quantity of carbon credits between the first party and the second party) as a set of transactions atomically updating a set of blockchain objects; and secure the set of transactions on a public blockchain for verification and/or audit.

13.1 Example: Blockchain Object Initialization

Generally, a first data node can execute Blocks of the method S100 to generate a first blockchain object representing a first state of a first structured data object as described above. Similarly, a second data node can execute Blocks of the method S100 to generate a second blockchain object representing a second state of a second structured data object.

In one implementation, during a first time period, the first data node can: access a first state of a first structured data object; generate a first hash tree representing the first state of the first structured data object in Block S102, the first hash tree including a first root hash; and submit a first transaction to the distributed network in Block S104, the first transaction configured to generate a first blockchain object in a set of blockchain objects, the first blockchain object including the first root hash.

In this implementation, the first data node can submit the first transaction configured to generate the first blockchain object including: a first set of identities (e.g., a first identifier associated with the first data node, a second identifier associated with the second data node) permitted read access to the first blockchain object; and a second set of identities (e.g., the first identifier associated with the first data node) permitted write access to the first blockchain object. More specifically, the first data node can submit the first transaction configured to generate the first blockchain object including the second set of identities, the second set of identities: including the first identifier associated with the first data node; and excluding the second identifier associated with the second data node.

In another implementation, during the first time period, the second data node can: access a second state of a second structured data object; generate a second hash tree representing the second state of the second structured data object, the second hash tree including a second root hash; and submit a second transaction to the distributed network, the second transaction configured to generate a second blockchain object in the set of blockchain objects, the second blockchain object including the second root hash.

In this implementation, the second data node can submit the second transaction configured to generate the second blockchain object including: a third set of identities (e.g., the first identifier, the second identifier) permitted read access to the second blockchain object; and a fourth set of identities (e.g., the second identifier) permitted write access to the second blockchain object. More specifically, the second data node can submit the second transaction configured to generate the second blockchain object including the fourth set of identities, the fourth set of identities: excluding the first identifier associated with the first data node; and including the second identifier associated with the second data node.

13.2 Example: Offer Generation

Blocks of the method S100 recite: generating a second transaction configured to generate a second blockchain object in the set of blockchain objects in Block S140, the second blockchain object including the second root hash; generating a first transaction container in Block S144, the transaction container including a) the second transaction and b) the first non-interactive proof of inclusion, the transaction container that is valid based on a first condition characterized by membership of a second data unit hash in a third hash tree, the second data unit hash representing a second data unit, the third hash tree representing a third state of a second structured data object including the second data unit; and transmitting an offer file to a second data node in the distributed network in Block S148, the offer file including the first transaction container.

Generally, the first data node can execute Blocks of the method S100 to: generate a third hash tree representing a third state of the first structured data object including the first data unit (e.g., a first data unit representing debit of a quantity of carbon credits); and access a first non-interactive proof of inclusion of a first data unit hash within the third hash tree, such as in a manner described above. More specifically, the first data node can generate the third hash tree including: a third root hash; and a first data unit hash representing the first data unit.

In one implementation, in Block S140, the first data node can generate a third transaction configured to generate a third blockchain object in the set of blockchain objects, the third blockchain object including the third root hash, such as in an analogous (e.g., similar, identical) manner as described above. More specifically, during a second time period succeeding the first time period, the first data node can generate the third transaction configured to: generate the third blockchain object based on the first blockchain object; and remove the first blockchain object from the set of blockchain objects. For example, the first data node can generate the third transaction configured to generate the third blockchain object based on the first blockchain object, the third blockchain object including: the first set of identities permitted read access to the first blockchain object (and the third blockchain object); the second set of identities permitted write access to the first blockchain object (and the third blockchain object); a puzzle hash; and/or a parent identifier associated with the first blockchain object.

Additionally, the first data node can: access a first change list representing a set of modifications from the first state of the first structured data object to the third state of the first structured data object; generate a first change list hash representing the first change list, the first change list hash including a first hash value representing insertion of the first data unit in the first structured data object; and generate the third transaction configured to generate the third blockchain object further including the first change list hash, such as in a manner described above. Additionally or alternatively, the first data node can generate the third blockchain object further including the first hash value representing insertion of the first data unit in the first structured data object.

In another implementation, in Block S144, the first data node can generate a fourth transaction configured to trigger the third blockchain object to generate a first announcement based on the first non-interactive proof of inclusion, the first announcement representing membership of the first data unit hash in the third hash tree. For example, the first data node can generate a fourth transaction configured to trigger the third blockchain object to generate the first announcement based on the first non-interactive proof of inclusion in an analogous (e.g., similar, identical) manner as described above.

Generally, a data node can generate a transaction container including a set of transactions and a set of signatures corresponding to the set of signatures. More specifically, the data node can generate the transaction container including a set of transactions, each transaction in the set of transactions corresponding to a spend of a respective blockchain object (e.g., execution of a respective puzzle included in the respective blockchain object). Additionally, the data node can generate the transaction container including a signature associated with an identifier associated with the data node.

In one implementation, in Block S144, the first data node can generate a first transaction container including: the third transaction; the fourth transaction; the first interactive proof of inclusion; and a first signature associated with the first identifier associated with the first data node.

Additionally, the first data node can generate the first transaction container that is valid based on a set of conditions. In one example, the first data node can generate the first transaction container that is valid based on a first condition in the set of conditions, the first condition characterized by membership of a second data unit hash in a fourth hash tree, the second data unit hash representing a second data unit (e.g., a second data unit representing credit of the quantity of carbon credits), and the fourth hash tree representing a fourth state of the second structured data object including the second data unit. In another example, the first data node can generate the first transaction container that is valid based on a second condition in the set of conditions, the second condition characterized by membership of the first data unit hash in the third hash tree. In yet another example, the first data node can generate the first transaction container that is valid based on: a third condition characterized by a first announcement representing membership of the first data unit hash within the third hash tree; and/or a fourth condition characterized by a second announcement representing membership of the second data unit hash within the fourth hash tree, In yet another example, the first data node can generate the first transaction container that is valid based on: a fifth condition characterized by receipt of the first non-interactive proof of inclusion of the first data unit hash within the third hash tree; and/or a sixth condition characterized by receipt of the second non-interactive proof of inclusion of the second data unit hash within the fourth hash tree.

Additionally or alternatively, the first data node can generate the third transaction (and/or the fourth transaction) that is valid based on the set of conditions. For example, the first data node can generate the third transaction (and/or the fourth transaction) that is valid based on the set of conditions, the set of conditions including the first condition, the second condition, the third condition, the fourth condition, the fifth condition, and/or the sixth condition.

Accordingly, by generating the first transaction container that is valid based on the set of conditions, the first data node can generate the first transaction container including transactions that are validated and included in a subsequent block in the blockchain if and only if the set of conditions are fulfilled.

In one implementation, in Block S148, the first data node can transmit an offer file to the second data node, the offer file including the first transaction container. For example, the first data node can transmit the offer file to the second data node via a peer-to-peer network.

13.2.1 Offer Terms

Generally, a data node can generate an offer file further including: a first set of terms representing an offer by the data node; and a second set of terms representing a request (or "demand") by the data node (e.g., transaction(s) signed by another data node, proof(s) of inclusion). In one example, a data node can generate the first set of terms including: a first set of transactions (and/or a first transaction container) that is valid based on a set of conditions; and a first set of proofs of inclusion associated with the first set of transactions. In another example, the data node can generate the second set of terms including: a second set of transactions (and/or a second transaction container) signed by another data node (and/or a set of data nodes) that is valid based on the set of conditions; and a second set of proofs of inclusion associated with the second set of transactions. In these examples, the data node can generate the first set of terms and the second set of terms such that the first set of transactions and the second set of transactions mutually fulfill the set of conditions.

In one implementation, the first data node can generate the offer file further including: a first set of terms representing an offer by the first data node; and a second set of terms representing a request by the first data node. More specifically, in Block S146, the first data node can generate the first set of terms including: a first term representing the third transaction to generate the third blockchain object; a second term representing the fourth transaction to trigger the third blockchain object to generate the first announcement based on the first non-interactive proof of inclusion; and a third term representing the first non-interactive proof of inclusion.

Additionally, in Block S146, the first data node can generate the second set of terms including: a fourth term representing a fifth transaction to generate a fifth blockchain object including a fourth root hash (i.e., a fourth root hash of a fourth hash tree representing a fourth state of the second structured data object including the second data unit); a fifth term representing a sixth transaction to trigger the fifth blockchain object to generate a second announcement representing membership of a second data unit hash (e.g., a second data unit hash representing the second data unit) in the fourth hash tree based on a second non-interactive proof of inclusion; and a sixth term representing the second non-interactive proof of inclusion.

In one implementation, the first data node can generate the first set of terms and the second set of terms based on a set of inputs received at an operator portal (e.g., web browser, graphical user interface, command-line interface). For example, the first data node can generate the first set of terms and the second set of terms based on a set of inputs received (e.g., received from a user associated with the first party) at an operator portal of the first data node.

13.3 Example: Offer Review

Blocks of the method S100 recite: receiving the offer file from the first data node in Block S150; and serving a notification in Block S152, the notification including a) a first set of terms representing an offer by the first data node and b) a second set of terms representing a request from the first data node.

In one implementation, in Block S150, during a third time period succeeding the second time period, the second data node can receive the offer file from the first data node. For example, the second data node can receive the offer file via from the first data node via a peer-to-peer network.

In another implementation, in response to receiving the offer file, the second data node can verify that an offer, corresponding to the offer file, is valid. For example, the second data node can: identify the set of blockchain objects; and, in response to detecting the first blockchain object in the set of blockchain objects, the second data node can detect that the offer is valid. Alternatively, in response to detecting the first blockchain object is excluded from the set of blockchain objects (e.g., the first blockchain object is spent and/or removed from the set of blockchain objects), the second data node can detect that the offer is invalid.

In one implementation, in Block S152, in response to receiving the offer file, the second data node can serve a notification including: a first set of terms representing an offer by the first data node; and a second set of terms representing a request from the first data node. More specifically, the second data node can serve the notification including: the first term representing the third transaction to generate the third blockchain object; the second term representing the fourth transaction to trigger the third blockchain object to generate the first announcement based on the first non-interactive proof of inclusion; the third term representing the first non-interactive proof of inclusion; the fourth term representing the fifth transaction to generate the fifth blockchain object including the fourth root hash; the fifth term representing the sixth transaction to trigger the fifth blockchain object to generate the second announcement based on the second non-interactive proof of inclusion; and the sixth term representing the second non-interactive proof of inclusion.

Additionally, the second data node can serve the notification in response to verifying the offer corresponding to the offer file is valid. More specifically, the second data node can serve the notification in response to detecting the first blockchain object in the set of blockchain objects.

In one implementation, the second data node can serve the notification at an operator portal (e.g., web browser, graphical user interface, command-line interface). For example, the second data node can serve the notification at an operator portal of the second data node. Accordingly, the second data node can present the first set of terms and the second set of terms to a user associated with the second party. Therefore, the user can confirm that the first set of terms and the second set of terms are consistent with the agreement.

Additionally, the second data node can execute Blocks of the method S100 to verify the third state of the first structured data object based on the third root hash and/or the first change list hash in an analogous (e.g., similar, identical) manner as described above.

13.4 Example: Offer Acceptance

Blocks of the method S100 recite, generating a third transaction configured to generate a third blockchain object in the set of blockchain objects in Block S154, the third blockchain object including the third root hash; generating a second transaction container in Block S58, the second transaction container including a) the second transaction, b) the first non-interactive proof of inclusion, c) the third transaction, and d) the second non-interactive proof of inclusion, the second transaction container that is based on i) the first condition and ii) a second condition characterized by membership of the first data unit hash in the third hash tree, and submitting the second transaction container to the distributed network in Block S160.

Generally, the second data node can execute Blocks of the method S100 to: generate a fourth hash tree representing a fourth state of the second structured data object including the second data unit (e.g., a second data unit representing credit of the quantity of carbon credits); and access a second non-interactive proof of inclusion of a second data unit hash within the fourth hash tree, such as in a manner described above. More specifically, the second data node can generate the fourth hash tree including: a fourth root hash; and a second data unit hash representing the second data unit.

In one implementation, in Block S154, the second data node can generate a fifth transaction configured to generate a fourth blockchain object in the set of blockchain objects, the fourth blockchain object including the fourth root hash, such as in an analogous (e.g., similar, identical) manner as described above. More specifically, during a third time period succeeding the second time period, the second data node can generate the fifth transaction configured to: generate the fourth blockchain object based on the second blockchain object; and remove the second blockchain object from the set of blockchain objects. For example, the second data node can generate the fifth transaction configured to generate the fourth blockchain object based on the second blockchain object, the fourth blockchain object including: the third set of identities permitted read access to the second blockchain object (and the fourth blockchain object); the second set of identities permitted write access to the second blockchain object (and the fourth blockchain object); a puzzle hash; and/or a parent identifier associated with the second blockchain object.

Additionally, the second data node can: access a second change list representing a set of modifications from the second state of the second structured data object to the fourth state of the second structured data object; generate a second change list hash representing the second change list, the second change list hash including a second hash value representing insertion of the second data unit in the second structured data object; and generate the fifth transaction configured to generate the fourth blockchain object further including the second change list hash, such as in a manner described above. Additionally or alternatively, the second data node can generate the fourth blockchain object further including the second hash value representing insertion of the second data unit in the second structured data object.

In another implementation, in Block S156, the second data node can generate a sixth transaction configured to trigger the fourth blockchain object to generate a second announcement based on the second non-interactive proof of inclusion, the second announcement representing membership of the second data unit hash in the fourth hash tree. For example, the second data node can generate a sixth transaction configured to trigger the fourth blockchain object to generate the second announcement based on the second non-interactive proof of inclusion in an analogous (e.g., similar, identical) manner as described above.

In one implementation, in Block S158, the second data node can generate a second transaction container including: the third transaction; the fourth transaction; the first non-interactive proof of inclusion; the first signature associated with the first identifier associated with the first data node; the fifth transaction; the sixth transaction; the second non-interactive proof of inclusion; and a second signature associated with the second identifier associated with the second data node.

Additionally, the second data node can generate the second transaction container that is valid based on a set of conditions as described above. In one example, the second data node can generate the second transaction container that is valid based on: the first condition characterized by membership of the second data unit hash in the fourth hash tree; and the second condition characterized by membership of the first data unit hash in the third hash tree. In yet another example, the second data node can generate the second transaction container that is valid based on: the third condition characterized by the first announcement representing membership of the first data unit hash within the third hash tree; and the fourth condition characterized by the second announcement representing membership of the second data unit hash within the fourth hash tree, In yet another example, the first data node can generate the first transaction container that is valid based on: the fifth condition characterized by receipt of the first non-interactive proof of inclusion of the first data unit hash within the third hash tree; and the sixth condition characterized by receipt of the second non-interactive proof of inclusion of the second data unit hash within the fourth hash tree.

Accordingly, by generating the second transaction container that is valid based on the set of conditions, the second data node can generate the second transaction container including transactions that are validated and included in a subsequent block in the blockchain if and only if the set of conditions are fulfilled.

In one implementation, in Block S160, the second data node can transmit the second transaction container to the distributed network. A full node (or a set of full nodes) in the distributed network can then validate and add the transactions in the second transaction container in a subsequent block in the blockchain as described above. More specifically, because the second data node submits the second transaction container including required inputs (e.g., signatures, proofs of space, announcements) to a) fulfill the set of conditions and b) execute the transactions based on the set of conditions, a full node in the network can validate and add these transactions in a subsequent block in the blockchain.

Additionally, in response to the second data node transmitting the second transaction container to the distributed network: the first data node can insert the first data unit into the first structured data object; and the second data node can insert the second data unit into the second structured data object.

Accordingly, the first data node and the second data node can execute Blocks of the method S100 to: represent an agreement as a set of transactions atomically updating a set of blockchain objects; and secure the set of transactions on a public blockchain. Therefore, these transactions can subsequently be verified and/or audited by the first party associated with the first data node, the second party associated with the second data node, and/or a third party authority.

14. Example: Pay on Inclusion

As shown in FIGS. 1A, 1B, 2, 4, and 5, in another example implementation, a first data node and a second data node can execute Blocks of the method S100 to complete an offer to pay on an inclusion of data. In this example implementation, the first data node can: subscribe to a structured data object generated and/or controlled by the second data object; and offer to transfer a first amount of an asset (e.g., a first amount of a cryptocurrency) to an address (e.g., an address associated with the second data node, an address associated with another data node) if and only if the second data node modifies the structured data object to include a first data unit.

14.1 Example: Object Initialization

Generally, during a first time period, the second node can: access a first state of a first structured data object (e.g., a first structured data object generated and/or controlled by the second data node); generate a first hash tree representing the first state of the first structured data object, the first hash tree including a first root hash; and submit a first transaction to the distributed network to generate a first blockchain object including the first root hash and a first change list hash, such as in an analogous (e.g., similar, identical) manner as described above.

Additionally, the first data node can track (or "subscribe") the first structured data object and generate a mirror of the first structured data object in an analogous (e.g., similar, identical) manner as described above. For example, during the first time period, the first data node can generate a second state of a second structured data object based on the first state of the first structured data object (i.e., the first state of the first structured data object omitting the first data unit). In this example, the first data node can: identify the first blockchain object in a set of blockchain objects; and verify the second state of the second structured data object based on the first root hash as described above.

Additionally or alternatively, the first data node can: generate the second state of the second structured data object based on the first state of the first structured data object and a change list representing a set of modifications between the first state of the first structured data object and a third state (e.g., a third state preceding the first state) of the first structured data object; identify the first blockchain object in the set of blockchain objects; and verify the second state of the second structured data object based on the first root hash and/or a change list hash, such as in an analogous (e.g., similar, identical) manner as described above.

Block S162 of the method S100 recites, submitting a first transaction to the distributed network, the first transaction configured to generate a first blockchain object in a set of blockchain objects, the first blockchain object representing a) a first address associated with the first data node, and b) a first amount of an asset.

In one implementation, in Block S162, the first data node (or another data node) can submit a second transaction to the distributed network, the second transaction configured to generate a second blockchain object representing: a first address associated with the first data node (or another data node); and a first amount of an asset (e.g., a first amount of a cryptocurrency), such as in an analogous (e.g., similar, identical) manner as described above in connection with generating a blockchain object. More specifically, during the first time period, the first data node can submit the second transaction configured to generate the second blockchain object further including: a first set of identities permitted read access to the second blockchain object; a second set of identities permitted write access to the second blockchain object; a puzzle hash; and/or a parent identifier.

14.2 Example: Offer Generation

Blocks of the method S100 recite: generating a second transaction in Block S168, the second transaction configured to a) generate a second blockchain object in the set of blockchain objects and b) remove the first blockchain object from the set of blockchain objects, the second blockchain object representing i) a second address associated with a second data node in the distributed network and ii the first amount of the asset; generating a first transaction container in Block S144, the first transaction container including the second transaction, the first transaction container valid based on a first condition characterized by membership of a first data unit hash in a first hash tree, the first data unit hash representing a first data unit, the first hash tree representing a first state of a first structured data object including the first data unit; and transmitting a first offer file including the first transaction container to the second data node in Block S148.

In one implementation, in Block S164, the first data node can generate a third transaction configured to generate a third blockchain object in the set of blockchain objects, the third blockchain object representing: a second address associated with the second data node (or another data node); and the first amount of the asset. More specifically, during a second time period succeeding the first time period, the first data node can generate the third transaction configured to, based on an announcement representing membership of a first data unit hash in a second hash tree, the first data unit hash representing the first data unit, the second hash tree representing a third state of the first structured data object including the first data unit: generate the third blockchain object based on the second blockchain object; and remove the second blockchain object from the set of blockchain objects, as described above.

In another implementation, in Block S144, the first data node can generate a first transaction container including: the third transaction; and a first signature associated with a first identifier associated with the first data node. Additionally, the first data node can generate the first transaction container that is valid based on: a first condition characterized by membership of the first data unit hash in the second hash tree; and a second condition characterized by a transfer of the first amount of the asset to the second address. Additionally or alternatively, the first data node can generate the first transaction container that is valid based on a third condition characterized by an announcement representing membership of the first data unit hash within the second hash tree. Additionally or alternatively, the first data node can generate the first transaction container that is valid based on a fourth condition characterized by receipt of a non-interactive proof of inclusion of the first data unit hash within the second hash tree.

Accordingly, the first data node can generate the first transaction container including data-dependent transaction that transfers the amount of the asset to the second address based on inclusion of the first data unit in the second structured data object.

Additionally, the first data node can generate: a first set of terms representing an offer by the first data node; and a second set of terms representing a request by the first data node, as described above. In one example, the first data node can generate the first set of terms including a first term representing the third transaction. In another example, the first data node can generate the second set of terms including: a second term representing a fourth transaction to generate a fourth blockchain object including a second root hash (i.e., a second root hash of the second hash tree representing the third state of the first structured data object including the second data unit); a third term representing a fifth transaction to trigger the fourth blockchain object to generate an announcement representing membership of the first data unit in the second hash tree based on a non-interactive proof of inclusion; and a fourth term representing the non-interactive proof of inclusion.

In one implementation, in Block S148, the first data node can transmit a first offer file to the second data node, the first offer file including: the first transaction container; the first set of terms; and the second set of terms.

14.3 Example: Offer Review

Generally, the second data node can: receive the offer file; verify an offer corresponding to the offer valid is valid; and serve a notification including the first set of terms and the second set of terms, such as in an analogous (e.g., similar, identical) manner as described above.

14.4 Example: Offer Acceptance

Blocks of the method S100 recite: generating a third transaction configured to generate a third blockchain object in the set of blockchain objects in Block S154, the third blockchain object including the first root hash; generating a second transaction container in Block S158, the second transaction container including a) the second transaction, b) the third transaction, and c) the non-interactive proof of inclusion, the second transaction container valid based on i) the first condition, and ii) a second condition characterized by a transfer of the first amount of the asset to the second address; and submitting the second transaction container to the distributed network in Block S160.

Generally, the second data node can execute Blocks of the method S100 to: generate a second hash tree representing a third state of the first structured data object including the first data unit; and access a non-interactive proof of inclusion of a first data unit hash within the second hash tree, such as in a manner described above. More specifically, the second data node can generate the second hash tree including: a second root hash; and a first data unit hash representing the first data unit.

In one implementation, in Block S154, the second data node can generate a fourth transaction configured to generate a fourth blockchain object in the set of blockchain objects, the fourth blockchain object including the second root hash, such as in an analogous (e.g., similar, identical) manner as described above. More specifically, during a third time period succeeding the second time period, the second data node can generate the fourth transaction configured to: generate the fourth blockchain object based on the first blockchain object; and remove the first blockchain object from the set of blockchain objects.

In another implementation, in Block S156, the second data node can generate a fifth transaction configured to trigger the fourth blockchain object to generate an announcement based on the non-interactive proof of inclusion, the announcement representing membership of the first data unit hash in the second hash tree, in an analogous (e.g., similar, identical) manner as described above.

In one implementation, in Block S158, the second data node can generate a second transaction container including: the third transaction; the first signature; the fourth transaction; the fifth transaction; the non-interactive proof of inclusion; and a second signature associated with a second identifier associated with the second data node.

Additionally, the second data node can generate the second transaction container that is valid based on a set of conditions as described above. For example, the second data node can generate the second transaction container that is valid based on: the first condition characterized by membership of the first data unit hash in the second hash tree; and the second condition characterized by a transfer of the first amount of the asset to the second address. Additionally or alternatively, the second data node can generate the second transaction container that is valid based on the third condition characterized by the announcement representing membership of the first data unit hash within the second hash tree. Additionally or alternatively, the second data node can generate the second transaction container that is valid based on the fourth condition characterized by receipt of the non-interactive proof of inclusion of the first data unit hash within the second hash tree.

In one implementation, in Block S160, the second data node can transmit the second transaction container to the distributed network as described above. A full node (or a set of full nodes) in the distributed network can then validate and add the transactions in the second transaction container in a subsequent block in the blockchain as described above.

14.5 Example: Counteroffer

Blocks of the method S100 recite: generating a second transaction container in Block S166, the second transaction container including a) the third transaction and b) the non-interactive proof of inclusion, the second transaction valid based on a second condition characterized by a transfer of a second amount of the asset to the second address; and transmitting a second offer file including the second transaction container to the first data node in Block S168.

In alternative implementation, in response serving the notification including the first set of terms and the second set of terms, the second data node can receive a set of inputs representing a counteroffer. For example, the second data node can receive a set of inputs representing: a third set of terms representing an offer by the second data node; and a fourth set of terms representing a request by the second data node. More specifically, the second data node can receive an input representing a fifth term, in the fourth set of terms, representing a transfer of a second amount of the asset (i.e., a second amount of the asset that is distinct from the first amount of the asset) to the second address.

In one implementation, in Block S166, during the third time period, the second data node can generate a third transaction container including: the third transaction; the first signature; the fourth transaction; the fifth transaction; the non-interactive proof of inclusion; a second signature associated with a second identifier associated with the second data node. Additionally, the second data node can generate the third transaction container that is valid based on a third condition characterized by a transfer of the second amount of the asset to the second address, the second amount of the asset distinct from the first amount of the asset.

In another implementation, in Block S168, during the third time period, the second data node can transmit a second offer file to the first data node, such as in an analogous (e.g., similar, identical) manner as described in connection with the first data node transmitting the first offer file to the second data node.

15. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
  generating a first hash tree representing a first state of a structured data object comprising a first data unit, the first hash tree comprising:
    a first root hash; and
    a first data unit hash representing the first data unit; and
  submitting a first transaction to a distributed network, the first transaction configured to generate a first blockchain object in a set of blockchain objects, the first blockchain object:
    comprising the first root hash;

configured to calculate a target root hash based on an input proof of inclusion of the first data unit hash in the first hash tree; and configured to generate an announcement, representing membership of the first data unit hash in the first hash tree, in response to a match between the target root hash and the first root hash.

2. The method of claim 1, further comprising:
accessing a second state of a second structured data object;
accessing the first root hash in the first blockchain object; and
verifying the second state of the second structured data object matches the first state of the structured data object based on the first root hash.

3. The method of claim 1, further comprising:
accessing a change list associated with the first state of the structured data object;
accessing the first root hash and a change list hash in the first blockchain object, the change list hash representing the change list;
generating a second state of a second structured data object based on the change list; and
verifying the second state of the second structured data object matches the first state of the structured data object based on the first root hash and the change list hash.

4. The method of claim 1, wherein submitting the first transaction comprises submitting the first transaction configured to calculate the target root hash based on a set of peer hashes along a path in the first hash tree from the first data unit hash to the first root hash and included in the proof of inclusion.

5. The method of claim 1, further comprising submitting a second transaction to the distributed network, the second transaction configured to generate a second blockchain object in the set of blockchain objects, the second blockchain object configured to transfer an asset to an address in response to the announcement.

6. The method of claim 1, further comprising:
validating the first transaction;
generating a block based on a proof-of-space, the block comprising the first transaction; and
adding the block to a blockchain.

7. The method of claim 1, further comprising submitting a second transaction to the distributed network, the second transaction:
comprising a proof of inclusion of the first data unit hash in the first hash tree;
configured to trigger the first blockchain object to:
calculate a second root hash based on the proof of inclusion; and
in response to a match between the second root hash and the first root hash, generate the announcement representing membership of the first data unit hash in the first hash tree;
configured to generate a second blockchain object in the set of blockchain objects, the second blockchain object comprising the first root hash; and
configured to remove the first blockchain object from the set of blockchain objects.

8. The method of claim 7, wherein submitting the second transaction comprises submitting the second transaction configured to generate the second blockchain object comprising a puzzle hash representing program code configured to:

calculate a second target root hash based on a second input proof of inclusion of the first data unit hash in the first hash tree; and
generate a second announcement, representing membership of the first data unit hash in the first hash tree, in response to a match between the second target root hash and the first root hash.

9. The method of claim 7, wherein submitting the first transaction comprises submitting the second transaction configured to trigger a third blockchain object in the set of blockchain objects to transfer an asset to an address in response to the announcement.

10. The method of claim 7, wherein submitting the second transaction comprises submitting the second transaction configured to generate the second blockchain object comprising a parent identifier associated with the first blockchain object.

11. The method of claim 7:
wherein submitting the first transaction comprises submitting the first transaction configured to generate the first blockchain object comprising a set of identities, permitted read access to the second blockchain object, the set of identities comprising an identifier associated with a first node in the distributed network; and
wherein submitting the second transaction comprises submitting the second transaction by the first node.

12. The method of claim 1:
further comprising inserting the first data unit in a second state of the structured data object, the second state of the structured data object absent the first data unit;
wherein generating the first hash tree comprises generating the first hash tree in response to inserting the first data unit in the second state of the structured data object; and
wherein submitting the first transaction comprises submitting the first transaction configured to remove a second blockchain object from the set of blockchain objects, the second blockchain object comprising a second root hash of a second hash tree representing the second state of the structured data object.

13. The method of claim 12, wherein submitting the first transaction comprises submitting the first transaction, by a first node in the distributed network, configured to:
generate the first blockchain object comprising a set of identities permitted write access to the first blockchain object, the set of identities comprising a first identifier associated with the first node; and
remove the second blockchain object comprising the set of identities.

14. The method of claim 12:
further comprising:
generating a change list representing insertion of the first data unit in the second state of the structured data object; and
generating a change list hash representing the change list; and
wherein submitting the first transaction comprises submitting the first transaction configured to generate the first blockchain object comprising the change list hash.

15. A method comprising:
submitting a first transaction to a distributed network, the first transaction:
comprising a proof of inclusion of a first data unit hash within a first hash tree representing a structured data object comprising a first data unit, the first data unit hash representing the first data unit;

configured to trigger a first blockchain object in a set of blockchain objects to:
  calculate a second root hash based on the proof of inclusion; and
  generate an announcement in response to a match between the second root hash and the first root hash;
configured to generate a second blockchain object in the set of blockchain objects based on the first blockchain object and comprising the first root hash; and
configured to remove the first blockchain object from the set of blockchain objects.

16. The method of claim 15, further comprising:
generating the first hash tree comprising the first root hash and the first data unit hash;
submitting a second transaction to the distributed network, the second transaction configured to generate the first blockchain object comprising the first root hash.

17. The method of claim 15, wherein submitting the first transaction comprises submitting the first transaction configured to generate the second blockchain object configured to:
calculate a target root hash based on an input proof of inclusion of the first data unit hash in the first hash tree; and
generate a second announcement, representing membership of the first data unit hash in the first hash tree, in response to a match between the target root hash and the first root hash.

18. The method of claim 15, wherein submitting the first transaction comprises submitting the first transaction configured to trigger a third blockchain object in the set of blockchain objects to transfer an amount of an asset to an address in response to the announcement.

19. A method comprising:
generating a hash tree representing a structured data object comprising a data unit, the hash tree comprising:
  a first root hash; and
  a data unit hash representing the data unit;
submitting a first transaction to a distributed network, the first transaction configured to generate a first blockchain object, the first blockchain object:
  comprising the first root hash;
  configured to calculate a target root hash based on an input proof of inclusion of the data unit hash in the hash tree; and
  configured to generate an announcement, representing membership of the data unit hash in the hash tree, in response to a match between the target root hash and the first root hash; and
submitting a second transaction to the distributed network, the second transaction:
  comprising a proof of inclusion of the data unit hash in the hash tree;
  configured to trigger the first blockchain object to:
    calculate a second root hash based on the proof of inclusion; and
    in response to a match between the second root hash and the first root hash, generate the announcement representing membership of the data unit hash in the hash tree; and
  configured to generate a second blockchain object based on the first blockchain object, the second blockchain object comprising the first root hash.

20. The method of claim 19, wherein submitting the second transaction comprises submitting the second transaction configured to trigger a third blockchain object to transfer an asset in response to the announcement.

* * * * *